US012809231B2

(12) United States Patent
Lindner

(10) Patent No.: US 12,809,231 B2
(45) **Date of Patent: *Nov. 24, 2026**

(54) IMAGING DEVICE WITH FOCUSED ILLUMINATION

(71) Applicant: Envirosight LLC, Randolph, NJ (US)

(72) Inventor: Richard Lindner, Morristown, NJ (US)

(73) Assignee: ENVIROSIGHT LLC, Randolph, NJ (US)

(*) Notice: Subject to any disclaimer, the term of this patent is extended or adjusted under 35 U.S.C. 154(b) by 276 days.

This patent is subject to a terminal disclaimer.

(21) Appl. No.: 18/815,584

(22) Filed: Aug. 26, 2024

(65) Prior Publication Data

US 2025/0216748 A1 Jul. 3, 2025

Related U.S. Application Data

(63) Continuation of application No. 17/967,135, filed on Oct. 17, 2022, now Pat. No. 12,072,607, which is a (Continued)

(51) Int. Cl.
*G03B 15/03* (2021.01)
*F21V 17/02* (2006.01)

(Continued)

(52) U.S. Cl.
CPC .............. *G03B 15/03* (2013.01); *F21V 17/02* (2013.01); *G01N 21/954* (2013.01); *G03B 3/02* (2013.01);

(Continued)

(58) Field of Classification Search
CPC .......... G03B 15/03; G03B 3/02; G03B 15/05; G03B 2215/0525; G03B 2215/0589; F21V 17/02; G01N 21/954; H04N 7/183
See application file for complete search history.

(56) References Cited

U.S. PATENT DOCUMENTS

| | | | |
|---|---|---|---|
| 4,670,821 | A | 6/1987 | Treadway |
| 4,931,866 | A | 6/1990 | Charlesworth |

(Continued)

FOREIGN PATENT DOCUMENTS

| | | |
|---|---|---|
| DE | 202014008760 | 2/2016 |
| EP | 1357329 | 10/2003 |

(Continued)

OTHER PUBLICATIONS

European Communication under Rule 71(3) EPC dated Mar. 14, 2025, in European Application No. 22200352.7, 67 pages.

(Continued)

*Primary Examiner* — James C. Jones
(74) *Attorney, Agent, or Firm* — Panitch Schwarze Belisario & Nadel LLP

(57) ABSTRACT

An imaging system having a forward and rearward orientation and comprising: (a) one or more parabolic reflectors having a base, a focus, and a reflector axis, said one or more parabolic reflectors defining a central reflector axis; (b) at least one a light source disposed near or essentially at said focus of each of said one or more parabolic reflectors forward of its base; and (c) an imaging device disposed within said one or more parabolic reflectors, and comprising a zooming lens having an optical axis essentially coincident with said central reflector axis.

18 Claims, 18 Drawing Sheets

Related U.S. Application Data continuation of application No. 16/876,853, filed on May 18, 2020, now Pat. No. 11,474,415, which is a continuation of application No. 15/583,685, filed on May 1, 2017, now Pat. No. 10,795,237, which is a continuation-in-part of application No. 14/045,453, filed on Oct. 3, 2013, now Pat. No. 9,733,549, which is a continuation of application No. 13/167,427, filed on Jun. 23, 2011, now Pat. No. 8,553,340.

(60) Provisional application No. 62/329,839, filed on Apr. 29, 2016.

(51) Int. Cl.

| | |
|---|---|
| ***G01N 21/954*** | (2006.01) |
| ***G03B 3/02*** | (2021.01) |
| ***G03B 15/05*** | (2021.01) |
| ***H04N 7/18*** | (2006.01) |

(52) U.S. Cl.
CPC ............. *G03B 15/05* (2013.01); *H04N 7/183* (2013.01); *G03B 2215/0525* (2013.01); *G03B 2215/0589* (2013.01)

(56) References Cited

U.S. PATENT DOCUMENTS

| | | | | |
|---|---|---|---|---|
| 5,047,908 | A | 9/1991 | Dixon | |
| 6,175,380 | B1 | 1/2001 | Van Den Bosch | |
| 6,538,732 | B1 | 3/2003 | Drost | |
| 7,432,978 | B2 | 10/2008 | Storm | |
| 7,480,041 | B2 | 1/2009 | Lindner | |
| 10,795,237 | B2 * | 10/2020 | Lindner | G01N 21/954 |
| 11,474,415 | B2 | 10/2022 | Lindner | |
| 2004/0125348 | A1 | 7/2004 | Carkner | |
| 2006/0120094 | A1 | 6/2006 | Tsukamoto | |
| 2009/0180110 | A1 | 7/2009 | Drost | |
| 2011/0317286 | A1 * | 12/2011 | Drost | H04N 7/183 362/277 |
| 2015/0176792 | A1 | 6/2015 | Hager | |

FOREIGN PATENT DOCUMENTS

| | | | |
|---|---|---|---|
| EP | 2551579 | A2 | 1/2013 |
| EP | 4137888 | B1 | 1/2026 |
| FR | 2919397 | A1 | 1/2009 |
| GB | 227702 | | 1/1925 |
| GB | 1330491 | | 9/1973 |
| GB | 2481184 | | 12/2011 |
| KR | 19990032192 | U | 7/1999 |
| WO | 9423538 | | 10/1994 |
| WO | 0206631 | | 1/2002 |
| WO | 2007047338 | | 4/2007 |

OTHER PUBLICATIONS

Bhatia Venay Sehgal, "Envirosight's New Quickview airHD Sewer Assessment Camera Delivers Live Wireless HD Video with Touch-screen Tablet Controls", Envirosight, (Feb. 18, 2016), pp. 1-4, Envirosight, URL: https://www.prweb.com/releases/2016/02/prweb13220359.html.
Communication pursuant to Article 94(3) EPC mailed Oct. 7, 2021 in European Application No. 17169083.7.
Communication pursuant to Article 94(3) mailed Dec. 17, 2019 in European Application No. 11 729 857.0 (4 pages).
Communication pursuant to Article 94(3) mailed Jul. 10, 2020 in European Application No. 11 729 857.0 (3 pages).
Communication relating to the results of the Partial International Search Report with the Invitation to Pay Additional Fees that was mailed Oct. 27, 2011, 2 pages.
Communication under Rule 71(3) EPC Intention to Grant mailed Sep. 8, 2020 in European Application No. 11 729 857.0 (56 pages).
European Communication pursuant to Article 94(3) EPC mailed Jan. 2, 204, in European Application No. 22200352.7.
European Communication pursuant to Rule 114(2) EPC dated Sep. 21, 2023, in European Application No. 22200352.7, pp. 1-17.
European Communication under Rule 71(3) EPC dated Aug. 8, 2023, in European Application No. 17169083.7.
Examination Report mailed Apr. 20, 2018 in Australian Application No. 2017208200, 4 pages.
Examination Report mailed Jan. 30, 2018 in Canadian Application No. 2,805,040, 3 pages.
Extended European Search Report mailed Jan. 4, 2023 in European Application No. 22200352.7.
German Utility Model Cancellation Procedure mailed Sep. 25, 2023 in German Application No. 20 2017 007 165.7, including English machine translation.
Gullyver, "Gesellschaft fur mobile Inspektionssysteme mbH," archived news history on Apr. 28, 2016 and Apr. 20, 2015; retrieved from <<https://web.archive.org/web/20160428052313/http://www.gullyver.de/startseite/new/news>>.
Gullyver, "Gesellschaft fur mobile Inspektionssysteme mbH; Willkommen auf der Gullyver Website," archived company website, Mar. 28, 2016, retrived from <<https://web.archive.org/web/20160326120459/http://www.gullyver.de:80/>>.
International Search Report dated Dec. 28, 2011 issued in PCT/US2011/041655 and Written Opinion, 15 pages.
MesSen Nord GmbH, Flyer for model STV4, Spring 2016, sent via invitation letter by post mail and email.
Notice of Acceptance mailed Apr. 17, 2019 for Australian Application No. 2017208200, 3 pages.
Notice of Acceptance of Patent Application mailed Apr. 17, 2019 in Australian Application No. 2017028200, 3 pages.
Notice of Allowance mailed Dec. 28, 2018 in Canadian Application No. 2,805,040, 1 page.
Office Action mailed Jul. 11, 2019 in European Application No. 11 729 857.0 (5 pages).
Partial EP Search Report dated Aug. 11, 2017 in Application No. EP 17 16 9083 (10 pages).
Wells, Jake, Envirosight, "Envirosight's New Quickview airHD Sewer Assessment Camera Delivers Live Wireless HD Video with Touchscreen Tablet Controls," Feb. 18, 2016, pp. 1-2, www.envirosight.com.
Notice of Opposition, issued Apr. 30, 2026, in EP Application No. 22200352.7.

* cited by examiner

IMAGING DEVICE WITH FOCUSED ILLUMINATION

RELATED APPLICATIONS

This application is based on Provisional Application No. 62/329,839, filed Apr. 29, 2016, and is a continuation-in-part of U.S. application Ser. No. 14/045,453, filed Oct. 3, 2013, which is a continuation of Ser. No. 13/167,427, filed Jun. 23, 2011, now U.S. Pat. No. 8,553,340. The aforementioned applications are hereby incorporated by reference in their entirety.

FIELD OF INVENTION

The present invention relates generally to a high-zoom imaging device for imaging objects at far range in limited light. More specifically, the invention relates to an imaging system in which the lighting and imaging devices are packaged to make their axes essentially coincident to facilitate high-zoom imaging in low-light conditions.

BACKGROUND OF THE INVENTION

It is often necessary to inspect and maintain areas under conditions that render them inaccessible or otherwise uninhabitable for humans for an extended period. These conditions include, for example, small confined spaces and harsh environments such as insufficient air/oxygen, presence of toxins, radioactivity, contamination, excessive dust, dirt and filth, and high noise levels. These conditions can be found, for example, in areas common to storm and sewer pipes, nuclear reactors and containment structures, fossil fuel plants and petrochemical refining facilities just to name a few. Although each area presents its own problems and complexities with respect to inspecting and maintaining, the inconvenient and time-consuming nature of performing an initial inspection is common to all.

For illustrative purposes, the inspection of storm and sewer pipes is considered in detail, although the scope of the present invention is by no means limited to this application. Most municipalities contain a vast network of storm and sewer pipes, often representing the oldest infrastructure in the community. Periodically, these pipes must be inspected for problems such as cracks, blockage, build-up, and root infiltration. To this end, it is common for an invasive device such as a pipe crawler or push camera to be introduced into the pipe to perform the inspection. Although effective in obtaining detailed images, using a pipe crawler is inconvenient and requires a great deal of time to set up and operate even if no problem is discovered. Furthermore, the use of pipe crawlers is frequently limited by the size and configuration of pipes to be entered. In this regard, often the condition of the pipe (e.g., debris and fractures) prevents the use of invasive inspection devices like crawlers. Therefore, there is a need for a more convenient approach to inspect and maintain underground pipes without the time and complexity associated with invasive techniques such as the use of pipe crawlers or push cameras.

This need has been fulfilled by the Quick View® inspection device commercially available from Envirosight LLC (Randolph, NJ), and described in a series of patents and patent applications, starting with U.S. Pat. No. 6,538,732, incorporated herein by reference. The '732 patent describes a quick and convenient non-invasive approach to ascertain the condition of an inaccessible or uninhabitable area before initiating an invasive procedure such as a comprehensive inspection or cleaning. More specifically, rather than physically entering the area with a robotic or push camera, a highly-maneuverable, hand-held inspection system is provided having an imaging head which can be readily positioned to image the general area initially, and then to zoom in on a target to obtain its image with the desired degree of detail. Thus, the device obtains images of inaccessible or uninhabitable areas by maneuvering an imaging head and using its magnification capabilities, rather than by physically entering the area.

U.S. Pat. No. 7,480,041 (incorporated herein by reference) further advances this technology by improving the performance and maneuverability of the inspection device. Specifically, this patent discloses a system and method for improving inspection of lateral pipes by enabling the imaging head to focus on a target at longer range down a pipe than typically previously possible. This involves positioning the imaging head reliably in an optimum location with respect to the lateral pipe, referred to as the "sweet spot." Generally, the optimum position is where the illumination source or lamp is positioned such that its light beam propagates down the pipe to the furthest extent possible before reflecting off the pipe wall and diffusing. The '041 patent discloses a targeting fixture to provide moderate resilient force as a user urges the imaging head into the sweet spot. The targeting fixture comprises, in one embodiment, a resilient member extending from the imaging head. In use, the inspection device is lowered into a manhole (or similar structure) until the targeting fixture rests on the bottom of a pipe (or similar structure). The user then pushes down on the imaging device until the imaging head is in the sweet spot. It has been found that pushing against the resilient targeting fixture provides a high degree of stability—essential during high magnification. Thus, the targeting fixture of the present invention enables the imaging head to be positioned in the sweet spot to achieve maximum illumination down the pipe, while providing enhanced stability for focusing on targets further down the pipe than previously possible.

US Patent Application Publication No. 20090180110 (incorporated herein by reference) further advances this technology by disclosing a long-range imaging system having an adjustable light beam. That is, this application recognizes that once a target is imaged down a pipe, slight adjustment of the lamp(s) while holding the imaged target steady can significantly improve the illumination of the target, and thus the quality of the image. This application also discloses the desirability of making the axis of the light beam coincident with the optical axis of the image device to maximize the illumination of the field of view.

While US Patent Application Publication No. 20090180110 recognized the need to have the axes of the light and the imaging device essentially coincident, the configuration disclosed therein necessarily involved an offset of the two axes because the lights were mounted to the side of the imaging device, thus necessitating some active adjustment of the light as the camera zoomed in and out. Therefore, there is a need for a simpler camera system in which the light axis and the imaging axis are essentially coincident without the need for active tuning as the device is zoomed in and out. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention facilitates long-range viewing by providing imaging system having a light source and one or more reflectors that define an axis essentially coincident with that of the imaging device. More specifically, in one embodiment, the imaging system comprises a single parabolic reflector that is placed behind a high-zoom, imaging device such that the axis of the reflector and the optical axis of the imaging device are essentially coincident. In another embodiment, the imaging system comprises one or more parabolic reflectors that are placed behind or around a high-zoom, imaging device such that the theoretical central axis of the reflectors axes and the optical axis of the imaging device are essentially coincident.

Such a configuration offers significant benefits. First, because the light and camera axes are essentially coincident, the device offers excellent imaging capability at far range with relatively little power expended on lighting. Because the present invention uses light more efficiently, less power is required to operate it. This has compounding benefits. For example, the reduction in power allows the system to use batteries instead of a supply cable if desirable. Furthermore, in one embodiment, the power may be supplied by batteries at the head of the device, thereby eliminating the need to supply power through a cable and a remote battery supply. Such an embodiment avoids the inherent voltage drop associated with transmitting power along a lengthy cable, thereby further reducing the power required to operate the imaging system. Thus, the present invention may realize compounded energy savings in certain embodiments.

There is also the benefit of reducing the bulk of the cable reaching the cable head and improving the overall maneuverability of the device, as the device no longer needs to be attached to a separate power supply. Furthermore, even if a remote power supply is still used, the reduced power requirements of the imaging system of the present invention reduce the gauge of the cable needed, and thus lighten the system and improve its maneuverability.

Benefits have also been realized by using a single point of light at or near the focal point of each parabolic reflector. Principally, it provides an unexpectedly high intensity spotlight with relatively little power. In an embodiment using a high intensity discharge lamp, the light also tends to have a high temperature which is generally desirable in inspection applications. Alternatively, a light emitting diode (LED) may be used as the point light source at or near the focal point of each parabolic reflector. Additionally, there is unexplained halo effect about the spotlight which serves to illuminate the periphery immediately in front of the imaging head. Although applicants do not wish to be bound to any particular theory, it is suspected that the halo effect may be the result of humidity within the inspecting location or possibly a reflection from the end or side walls.

Another benefit of the camera system is that it promotes a single enclosure. There is no longer a need to machine separate housings for the lights and the imaging devices. They are all contained within a single, modular housing comprises one or more integrated components. Additionally, such a configuration has very few moving parts, which not only reduces mechanical wearing, but also reduces weight and inventory requirements and simplifies manufacturing.

Therefore, the configuration of the present invention uses light more efficiently to improve imaging performance, reduce power consumption, to provide a less-encumbered, simplified package, making it more maneuverable and readily manufactured than prior art inspection devices.

Accordingly, in one embodiment, the imaging system has a forward and rearward orientation and comprises: (a) one or more parabolic reflectors having a base, a focus, and a reflector axis, the one or more parabolic reflectors defining a central reflector axis; (b) at least one a light source disposed near or essentially at the focus of each of the one or more parabolic reflectors forward of its base, and being configured to emit light toward the each of the one or more parabolic reflectors such that the each of the one or more parabolic reflectors reflects the light to emit a beam of light; and (c) an imaging device disposed within the one or more parabolic reflectors, and comprising a zooming lens having an optical axis essentially coincident with the central reflector axis, the imaging device configured to image a field of view along the optical axis forward of the imaging device.

In another embodiment, the imaging system comprises: (a) an imaging device having a zoom lens defining a position point; (b) at least one housing containing the imaging device; (c) a positioning system comprising an elongated member for positioning the imaging device, and (d) a tilting mechanism operatively connected between the housing and the positioning system, the tilting mechanism being configured to tilt the housing relative to the elongated member such that the housing pivots around the position point.

In yet another embodiment, the imaging system comprises: (a) an imaging device; (b) at least one housing containing the imaging device; and (c) a positioning system comprising a ratchet mechanism and a targeting fixture, the targeting fixture having a distal end and a resilient member for applying a biasing force to bias the distal end outwardly from the imaging device, the ratchet mechanism being configured such that, as the distal end is push toward the imaging device against the biasing force, the ratchet mechanism incrementally ratchets up the distal end to prevent the distal end from returning to its extended position away from the imaging device.

DETAILED DESCRIPTION

Figure 1:
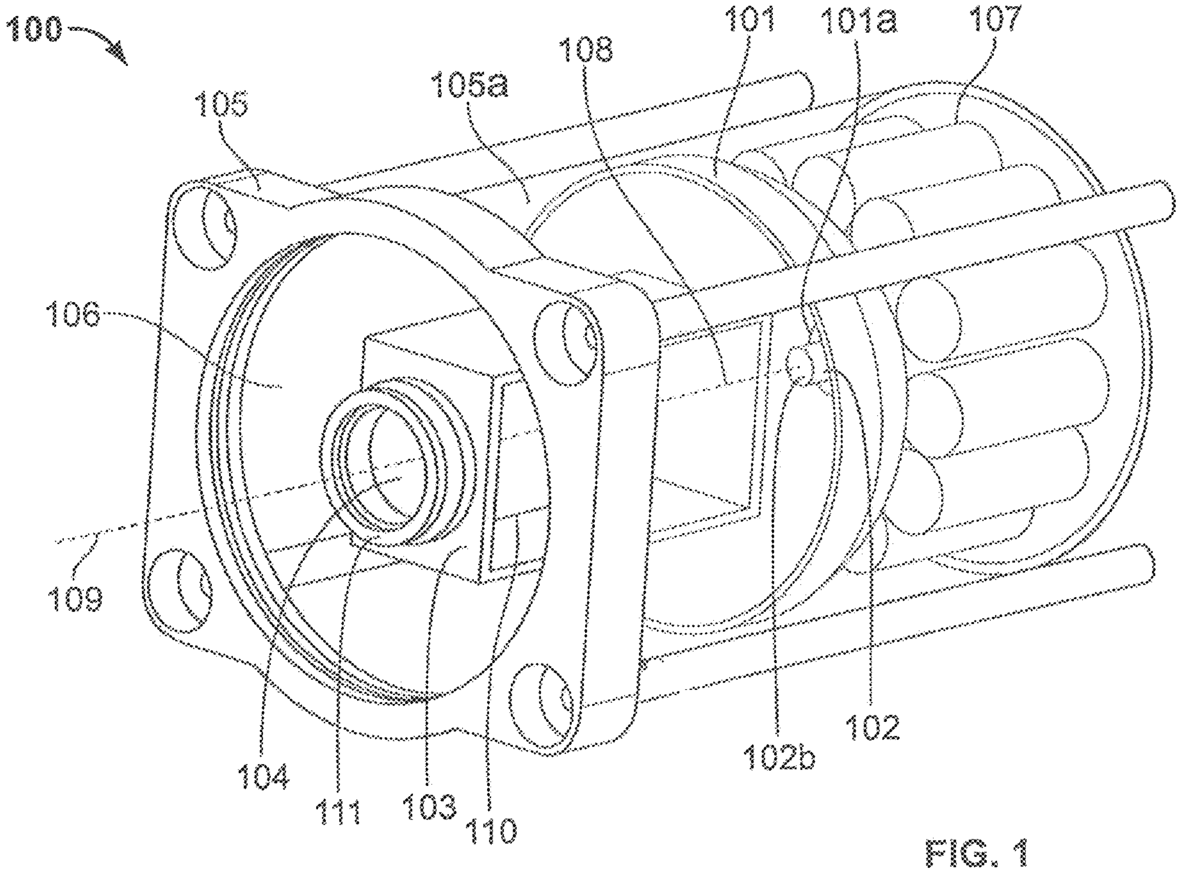
FIG. 1 shows a perspective view of the imaging head of the present invention.

Referring to FIG. 1, one embodiment of an imaging system 100 of the present invention is depicted schematically. The imaging system 100 comprises: (a) a parabolic reflector 101 having a base 101*a* and defining a first axis 108; (b) a light source 102 disposed proximate the base 101*a*; (c) an imaging device 103 comprising a zooming lens 104 and having a second axis 109. The imaging device is disposed in front of the light source 102 such that the second axis 109 is essentially coincident with the first axis 108.

Each of these elements is considered in greater detail below and with respect to examples of alternative embodiments. It should be understood, however, that the classification of the system in these discrete elements is for illustrative purposes and should not be construed to limit the scope of the invention. For example, it is anticipated that two or more elements may correspond to a single component or the functionality of one element may correspond to two more components.

Additionally, while the imaging system is considered in detail with respect to a pipe inspection system, the invention is not limited to such applications. For example, the imaging system embodiments of the present invention may be used in any application requiring both illumination and long-range, zoom imaging. Such applications include, for example, filming at long distances in relatively dark conditions (e.g., high-zoom cameras mounted to news and police helicopters for filming activity on the ground), a hand held camera, or a truck-mounted or hand-held camera system for bridge inspection. Furthermore, the present invention is not limited to imaging systems embodiments, and may be used without an imaging device to provide a portable, high-intensity light source.

Reflector

The one or more parabolic reflectors functions to collimate the light emanating from lamp or light source in a forward direction. The extent to which the light is collimated will depend on the application. For example, if the application involves long range viewing down a narrow passage, then a parabolic reflector with a relatively steep slope may be desirable in which the light beam is collimated with essentially no divergent angle. On the other hand, if the application involves imaging at a relatively moderate distance in a more open space, then a parabolic reflector with a more moderate slope may be desired such that the light beam is substantially collimated but has a slight angle of divergence to allow light to wash the field of view to some extent. One of skill in the art may optimize the parabolic slope of the reflector to optimize imaging in light of this disclosure.

Considering pipe inspection for illustrative purposes, because long range viewing in a confined space is required, a collimated beam with essentially no divergence is desirable. To this end, the parabolic curve of the reflector should be relatively steep as mentioned above. Although a range of slopes is acceptable, in one embodiment, the parabolic portion of the reflector extending from its base has the following equation based on the Cartesian coordinate system:

$$y=(nFx)^{1/2}$$

wherein:

x is the distance from the base of the reflector;

y is the interior surface position of the reflector;

F is the focal length; and n is a constant

Although F and n may vary, in one embodiment, F is in the range of about 13 mm to about 19 mm, and n is in the range of about 3 to about 5. Although the precise equation is a matter of optimization, good results have been obtained wherein F is about 15 to about 16.5 mm, and n is about 4. In one particular embodiment, F is 15.8 mm, and n is about 4. It should be understood, however, that the present invention unless otherwise stated is not limited by these values or the aforementioned equation. Such reflectors are commercially available from, for example, Opti-forms Inc. (Temecula, CA).

In addition to optimizing the parabolic curve, the diameter of the reflector should be optimized for the parameters of the application. Such parameters may include, for example, the size of the imaging device (i.e., the reflector needs to be sufficiently larger than the imaging device such an adequate amount of collimated light is directed around the imaging device), and the size of the enclosures to be imaged. Often these parameters may be at odds. For example, although a larger reflector may be preferable from an optics standpoint, a smaller reflector may be desirable to fit in a confined space—e.g., small municipal pipes. Therefore, the choice of reflector size will be a function of the application.

In one particular application for inspecting municipal pipes, Applicants have found that a reflector with a diameter of about six inches is sufficiently large to direct light around the imaging device, yet narrow enough to fit in a majority of municipal pips (eight inch pipes tend to be the more common pipe diameters in the industry).

The reflector may comprise any known materials for reflecting light, including, for example, polished metals (e.g. nickel, chrome, stainless steel, aluminum), reflective polymers and coatings (e.g. metallic and reflective films and paints), and reflective glass (e.g. mirrors). Furthermore, the reflector may be a composite material having a metal substrate for strength and a coating for reflectiveness. In one particular embodiment, the reflector comprises a machined aluminum substrate coated with a vapor-deposited nickel.

In one embodiment, the reflector is also shatter-proof and rugged. To this end, the reflector may be configured to withstand or absorb energy from impacts as a result of being knocked about in use. In this regard, one embodiment of the reflector is structurally rigid to withstand such jarring. In another embodiment, at least a portion of the reflector is deformable to absorb energy from jarring. In this later embodiment, at least a portion of the reflector may also be coated with a shock-absorbing material, such as an elastic polymeric material.

Figure 5:
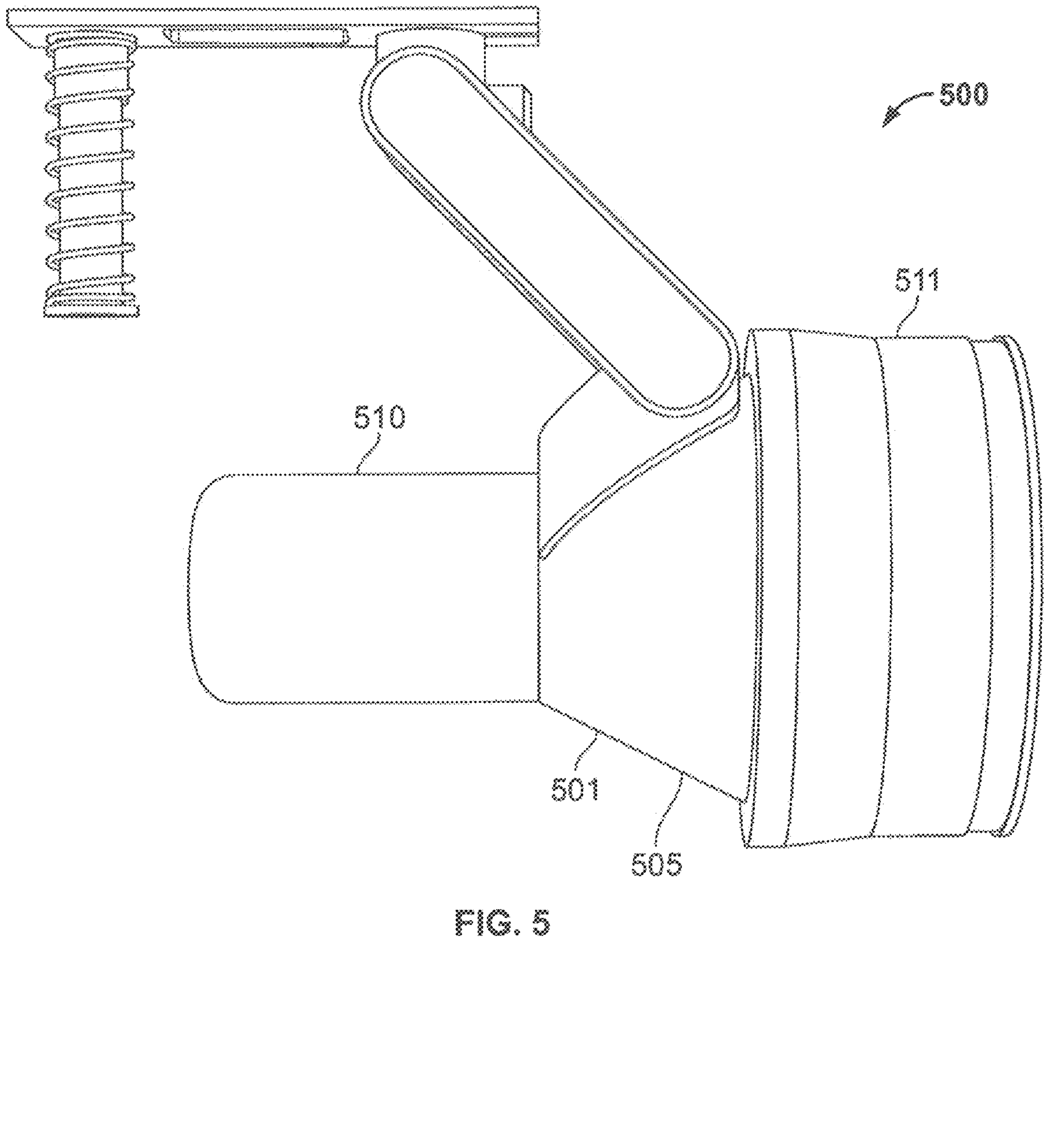
FIG. 5 shows an alternative embodiment of the imaging system of present invention in which the reflector is integral with housing.

The reflector may also be sufficiently rigid to provide a structural support for the other components of the imaging head, including the lamp and the imaging device. For example, rather than using a housing 105 to contain the reflector 101 and imaging device 103 as shown in FIG. 1, it may be preferable to use the reflector 501 as a portion of the housing as shown in FIG. 5. In this embodiment, the imaging system 500 comprises a reflector 501 that forms a portion of the housing and is configured with an integrally-formed rear portion 510 at its base for containing electronics for the lamp, and perhaps batteries and other electronics used in the imaging system. Although the rear portion 510 is integrally formed with reflector 501 in the embodiment shown in FIG. 5, it should be appreciated that other embodiments are possible including a discrete rear portion that is mechanically interengaged (e.g., threaded engagement), welded or otherwise adhered to the base of reflector 501.

The reflector in the embodiment of FIG. 5 is also configured to receive a front portion 511 which holds the transparent front face and contains the imaging device (not shown). Like the rear portion 510, the front portion 511 may be integrally formed with the reflector 501 or mechanically interengaged (e.g., threaded engagement) with the reflector 510 or it may be welded or otherwise adhered to the reflector 501. In the embodiment shown in FIG. 5, the reflector 501 is threadedly interengaged with the front portion 511.

In one embodiment, the reflector comprises an assembly of reflectors. For example, referring to FIG. 17, a schematic of a cross section of a multi-reflector configuration 1700 is shown. As shown, one or more parabolic reflectors 1701, 1702 have a base 1701*b*, 1702*b*, a focus 1701*c*, 1702*c*, and a reflector axis 1701*a*, 1702*a*, and the one or more parabolic reflectors defines a central reflector axis 1700*a*. At least one a light source 1705, 1706 is disposed near or essentially at the focus of each of the one or more parabolic reflectors forward of its base, and being configured to emit light toward the each of the one or more parabolic reflectors such that the each of the one or more parabolic reflectors reflects the light to emit a beam of light 1710, 1711. In this embodiment, the at least one light source 1710, 1711 radiates light essentially perpendicular to the reflector axis 1701*a*, 1702*a*, respectively.

An imaging device 1703 is disposed within the one or more parabolic reflectors, and comprises a zooming lens (not shown) having an optical axis 1704 essentially coincident with the central reflector axis 1700*a*. The imaging device is configured to image a field of view along the optical axis forward of the imaging device.

In one embodiment, the one or more parabolic reflectors 1700 comprises a plurality of parabolic reflectors 1701, 1702. As one of skill in the art will recognize, the central reflector axis 1700*a* is the axis of the axes 1701*a* of the plurality of parabolic reflectors.

Figure 17:
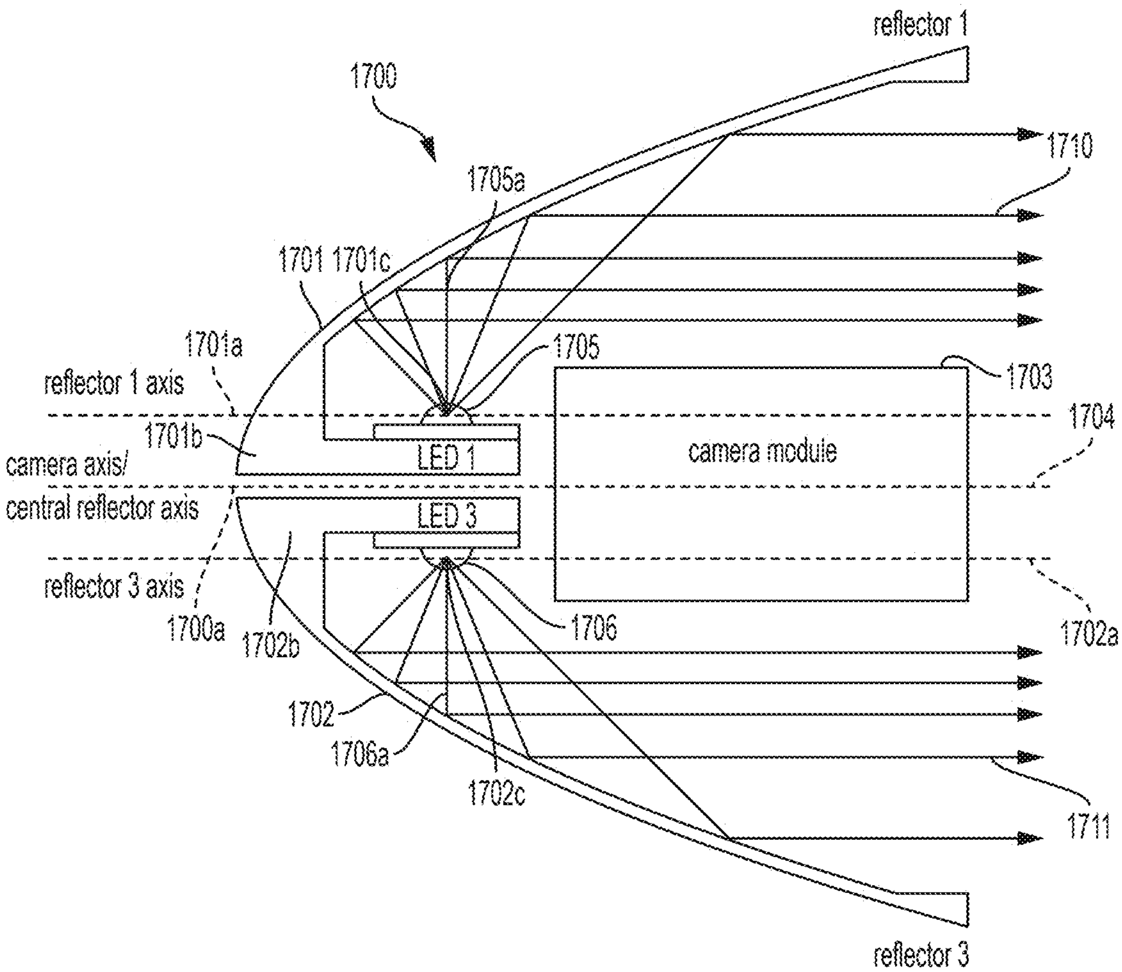
FIG. 17 is a schematic of a cross section of a reflector comprising a plurality of reflectors.

In the embodiment of FIG. 17 the plurality of parabolic reflectors comprises four parabolic reflectors. This can be seen in FIG. 18. In that figure, the system 1800 comprises reflectors 1801, 1802, 1803 and 1804. In this particular embodiment, the four parabolic reflectors comprise identical quadrants. It should be understood, however, that the number of parabolic reflector components can vary—e.g. 2, 3, 4, 5, 6, 7, 8 etc.—based on the application. As described below, by configuring the parabolic reflector as an assembly of reflectors, the number of light sources in the device can be increased because each reflector component comprises a light source.

Light Source

The light source used in the imaging system of the present invention functions to provide the illuminating source for the imaging device 103. Suitable light sources are well known in the art, and include, for example, halogen lights, incandescent bulbs, high intensity discharge lamps, gas discharge lamps (e.g., fluorescent), and light emitting diodes (LEDs), just to name a few. Generally, although not necessarily, lamps with relatively small points of light generation or discharge tend to be more effective in combination with the parabolic reflector.

In one embodiment, the light source or lamp is a high intensity discharge (HID) lamp. It has been found that such lamps are particularly well suited for inspection applications since they have higher greater lumen output per watt. Minimizing power consumption is critical to reducing the need for auxiliary power, promoting the use of lighter (thinner) power cable, and even facilitating on-board battery power. HID lamps also have relatively high color temperature, which enhances imaging at lower light levels, which are common in pipe imaging. Suitable HID lamps are commercially available.

It has been found also that the narrow arc of HID lamps (e.g. about 2 mm) enables the arc of the lamp to be positioned optimally within the reflector such that the outward projection of the light is maximized. In other words, unlike traditional lamps (e.g., filament or gas discharge tube) in which the point of light is relatively large, the arc of the HID is very small, essentially a pin point of light allowing it to be positioned precisely. In one embodiment, the arc of the lamp is positioned essentially at the theoretical focus of the parabola of the reflector to optimize the reflection of light out. Other lamps having relatively small points of light generation will also function well in the imaging system of the present invention. It should be understood that while locating the point of light generation at or near the focus of the parabola tends to be preferred, this feature is not necessary to practice the invention unless indicated otherwise in the claims.

In one embodiment, the lamp is mounted essentially along the first axis 108 at the base 101*a*.

In one embodiment, the lamp is configured to emanate light radially rather than through its top. More specifically, because the imaging device 103 is disposed directly in front of the lamp 102, any light emanating directly from the top of lamp 102 needs to be reflected back by the imaging device and then forward again by the reflector 101. This compound reflection can be simplified by choosing a lamp having a reflective or frosted surface 102*b* at its top to ensure or facilitate the radial emanation of light from the lamp. Alternatively, light sources such as LEDs, which have a narrow beam, may arranged to transmit light normal to the first axis. Again, lamps having such a configuration are known in the art, and are commercially available.

Figure 7:
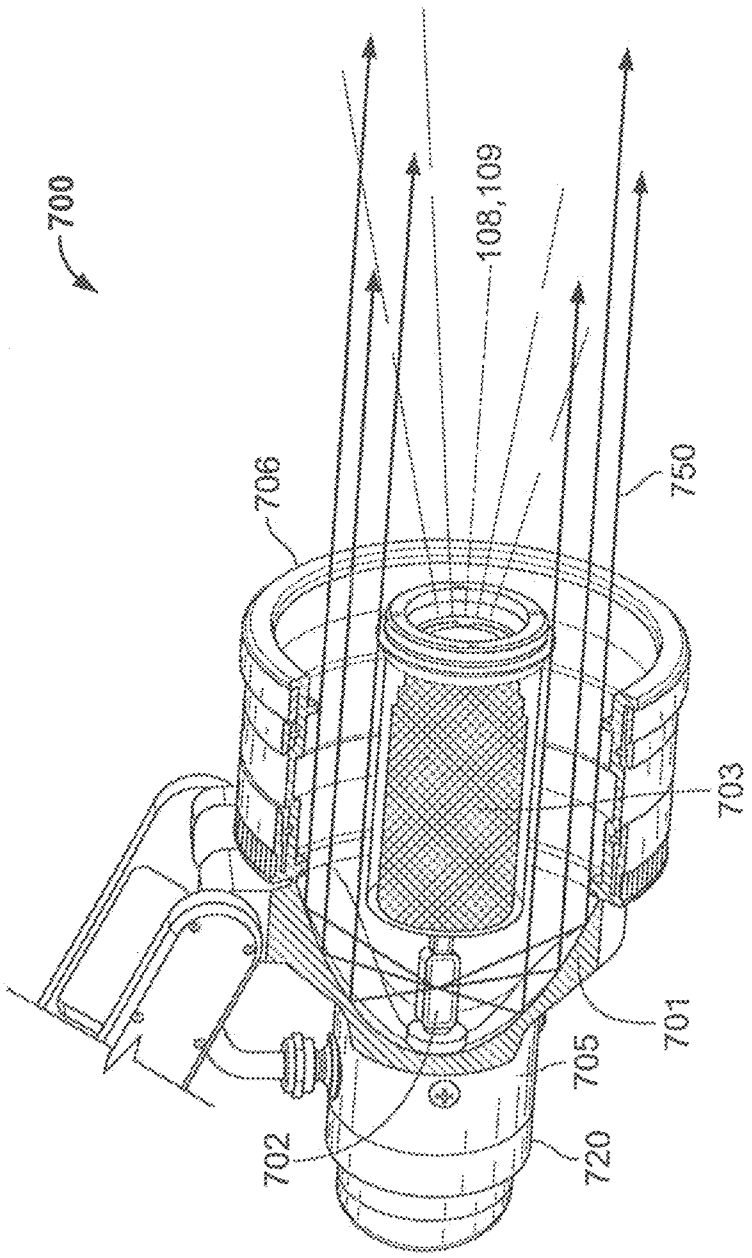
FIG. 7 shows a ray diagram of one embodiment of the imaging system of the present invention.

Referring to FIG. 7, an imaging system 700 is shown with a portion of the housing 705 removed to show a schematic ray diagram in which light 750 emanating from the light source 702 is reflected by the reflector 701 and collimated to propagate essentially parallel to the first and second coincident axes, 108, 109. This ray diagram also illustrates how light that emanates essentially perpendicular to the axes from the light source avoids the imaging device 703 to a significant extent. Nevertheless, in one embodiment, a rear portion of the imaging device 703 facing the light source is made reflective to reflect any light back into the reflector such that it is directed out the front face 706 as shown. In this respect, a reflective coating may also be applied to other components in the rear portion 720 of the housing (e.g., ballast) to ensure that any errant light rays are reflected out the front face 706.

In another embodiment, the light source is an LED light source. LEDs tend to be very efficient and thus lend themselves to wireless applications in which the power supply involves a battery which has limited capacity. At this time, LEDs tend not to be a bright as other light sources such as HID as described above. Because LEDs are not was bright as other light sources, in one embedment, a plurality of LEDs are used. For example, in the embodiment of FIGS. 17 and 18, each parabolic reflector component 1701 has an LED 1705. As described above, in one embodiment, an LED is disposed along the reflector axis of each parabolic reflector component.

Figure 18:
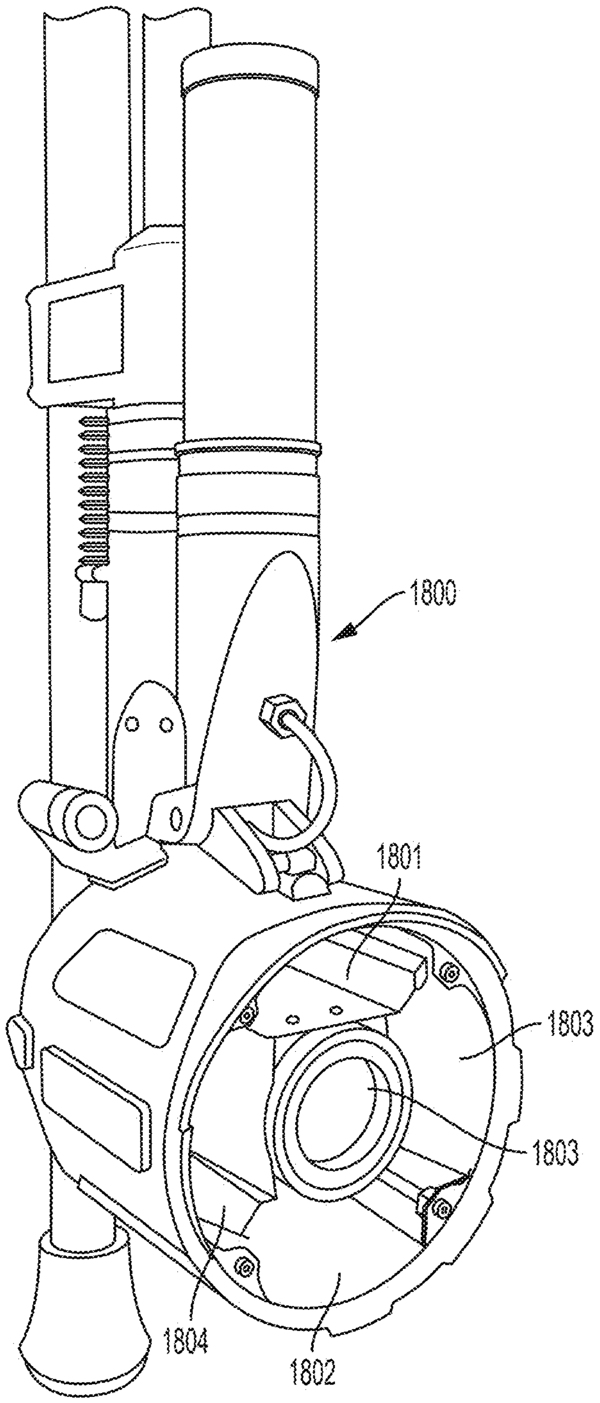
FIG. 18 is a front view of the imaging system having a plurality of reflectors.

In the embodiment shown in FIGS. 17 and 18, the LEDs have a emission axis, for example axes **1705*a* and 1706*a* for LEDs 1705, 1706, respectively. In this embodiment, the LEDs are disposed such that their emission axis is essentially perpendicular to the reflector axis of each parabolic reflector component. Such a configuration lends itself to manufacturability due to the convenient right angle construction of the base. Additionally, such a configuration avoids directing a large portion of the light directly into the back of the imaging device 1703**, where it must be reflected back into the reflector and then reflected forward again which reduces efficiency.

Imaging Device

The function of the imaging device is to generate and transmit an electrical signal corresponding to an area being imaged, herein referred to as the "image signal." The imaging device 103 may be any conventional or subsequently-developed device for imaging a target object. The term "imaging" broadly refers to a characterization or representation of the target object based on a particular property, such as, for example, its tendency to reflect or absorb electromagnetic radiation, its thermal profile, or its acoustical profile. Devices for imaging these characteristics or properties are known and include, for example, video cameras, still cameras, digital cameras, infrared detectors, X-ray machines, lasers, microphones, sonic or ultrasonic transducers, radar, and the like.

Figure 8:
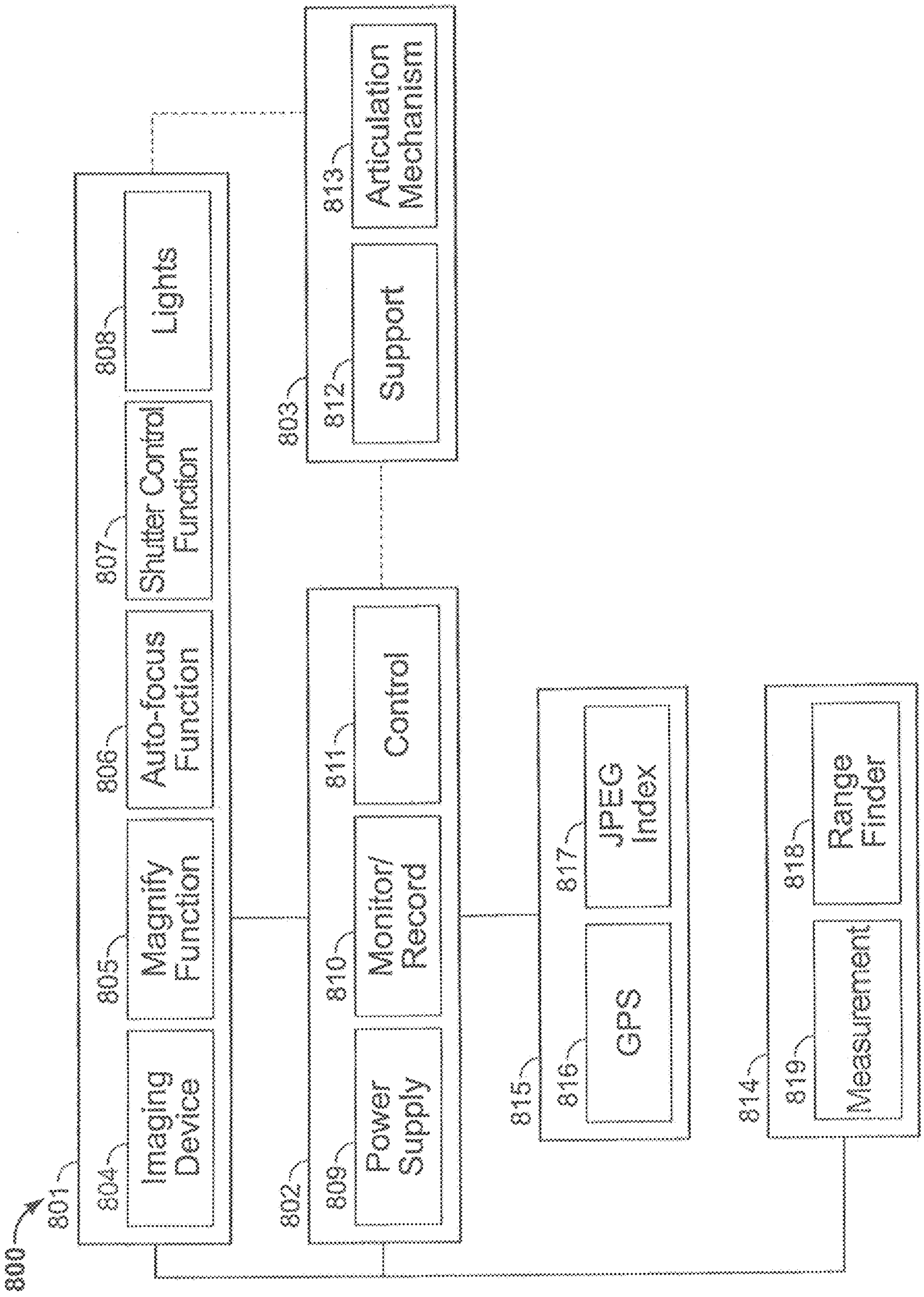
FIG. 8 shows a schematic of the support and measurement system.

In one embodiment, the imaging device 103 provides a video image of the target area. The Imaging device includes image generating electronics such as a charge coupled device (CCD), complementary metal oxide semiconductor (CMOS), or a digital megapixel camera. Such imaging devices are well known and thus there is no need to discuss them herein in detail. Referring to FIG. 8, the CCD electronically captures an image of the video field in an analog format and the analog information is relayed to the monitor/digital recording functionality 210 of the support system 202. In one embodiment, the CCD is a low-lux CCD having a sensitivity of at least 2 Lux at f1.4, and, more in one embodiment, at least 1 Lux at f1.4.

An important aspect of the imaging device is the zoom lens 104, which comprises one or more lenses for providing zooming functionality. As used herein, the term zoom lens refers to a mechanical assembly of one or more lens elements with the ability to vary its focal length (and thus angle of view), as opposed to a fixed focal length lens. As used herein, a zoom lens includes both a parfocal lens, which is one that maintains focus when its focal length changes, and a varifocal lens, which is one that loses focus during zooming. The zoom lens has inherent optical characteristics such as distortion, focal length, and field of view, some of which are used in the calculation of the target size as is described in detail below. Suitable results have been obtained with an imaging device having a focal length of about 3 mm (wide) to about 150 mm (telephoto), even more preferred is a focal length of about 3.4 mm (wide) to 122.4 mm (telephoto), a horizontal field of view of about 1.0° (telephoto) to about 60° (wide), even more preferred is a field of view of 1.7° (telephoto) to 57.8° (wide), and a minimum working distance to target of 300 mm (wide) to 1500 mm (telephoto).

As is known in the art, the zoom lens 104 may include motors that manipulate the positioning of the various individual lenses in relation to each other and in relation to the imaging device 103 in order to effect different foci and magnification configurations. These motors are responsive to a zoom signal from the support system.

The zoom functionality 205 (FIG. 8) is capable of achieving a relatively high zoom ratio. More specifically, the intended applications of the inspection system of the present invention usually require a panoramic, wide angle view for general viewing, and a magnified view for details. Again, such functionality is well known in the art and may comprise, for example, optical magnification or electronic magnification using techniques such as pixel enlargement or interpolation. In one embodiment, the magnification has a zoom ratio of no less than about 6:1, in a more preferred embodiment, no less than about 12:1, and in an even more preferred embodiment, no less than about 50:1. In a highly preferred embodiment, the zoom ratio is 216:1 and is the composite of an 18:1 optical zoom and a 12:1 digital zoom. It is anticipated that even high zoom ratios may be used. For example, zoom functionality having a ratio of 432:1 (composite of 32:1 optical and 12:1 digital) is currently available.

The imaging head, in one embodiment, comprises auto focus functionality 206. Again, auto focusing is known in the art. In one embodiment, the imaging head provides for manual focusing thereby allowing the user to control the focus if, for example, the auto focus is focusing on the wrong object or the range of the target is too far under high zoom conditions. In one embodiment, the focus and zoom motors contain servo-feedback mechanisms, which provide information to a microprocessor.

In one embodiment, the imaging head also enables the user to control the shutter speed manually through shutter control functionality 207 (FIG. 8). More specifically, in certain applications, for example, in low light conditions, it may be desirable for the user to extend the exposure time to increase the amount of light in the image. For example, shutter speed may be increased from a typical period of about 1/50 second to about 1/3 second.

Suitable imaging heads having the above-mentioned magnification and functionality are commercially available from, for example, Sony Company (e.g. Model Nos. FCB-IX47, FCB-EX1020, FCB-EX1020P and EX-1010)

In one embodiment, the imaging device and the above-mentioned functionality are integrally packaged in a module, shown schematically as a rectangular enclosure 110 in FIG. 1. This module, in turn, is positioned in front of the reflector 102 in a housing 105 or in a front portion 511 (FIG. 5) such that the first and second axes essentially coincide. Additionally, in one embodiment, the rear of the module 110 is coated or otherwise configured with a reflector such that any incident light is reflected backward into the parabolic reflector 101 and then, ultimately, past the imaging device 103 and into the field of view.

Housing

In the embodiment shown in FIG. 1, the imaging system 100 has the frame/housing 105, which serves to contain and protect the reflector, lamp, and imaging device. The housing 105 is discrete from the reflector 101. In this particular embodiment, the housing comprising a cylindrical sleeve 105*a* (just the outline is shown to reveal the internal components), which containing the imaging device 103, reflector 101, lamp 102 and optionally batteries 107 (discussed below). Alternatively, as shown in the imaging system 500 shown in FIG. 5, the reflector 501 may function as a portion of the housing 505, or even as the entire housing. Using the reflector for at least a portion of the housing offers benefits of design and manufacturing simplicity.

The housing is configured, in one embodiment, to be a rigid, splash proof enclosure. In one embodiment, the enclosure is sealed and watertight thereby allowing it to be submerged. To this end, it may be desirable to pressurize the enclosure to match the anticipated hydrostatic pressure to minimize the risk of leakage. Portions of the housing may also be coated with shock-absorbing materials such as elastic polymer as described above with respect to the reflector.

In one embodiment, the housing 105 includes a transparent front face 106 through which the first and second axes 108, 109 pass through. The transparent front face may comprise any known rigid, transparent material. In one embodiment, the material is hard and durable, and includes, for example, glass, quartz, or polymeric materials (e.g., acrylate polymer), commercially-available as Plexiglas® or Lenox®.

Imaging Device Alignment Mechanism

As mentioned above, an important aspect of the present invention is that the optical axis (or second axis 109) is aligned with the reflector axis (or first axis 108). The present invention contemplates a variety ways of aligning the imaging device 103 such that the second axis 109 is essentially coincident with the first axis 108. For example, in the embodiment shown in FIG. 1, the housing comprises a transparent front face 106 to which the imaging device 103 is secured. More specifically, as shown in FIG. 1, on the exposed side of the front face 106 is disposed a bracket 111 having one or more fasteners (not shown), which extend through the bracket and into the zoom lens 104 to secure the zoom lens to the front face 106. Alternatively, the imaging head 103 may be supported by brackets that extend radially inwardly from the housing or from the reflector. (The latter embodiment may be preferred in the event that the reflector is used as the housing.) Still other methods of mounting the imaging device 103 such that the first and second axes are coincident will be obvious to those skilled in the art in light of this disclosure.

In one embodiment, the imaging device 103 is mounted to minimize variation between the relative position of the zooming lens 104 and reflector. Applicants recognize that it is critical that the imaging device 103 be precisely positioned relative to the reflector since a small degree of variation can have a profound impact at high magnification. For example, a one degree variation in camera position equates to 30 inches at 150 feet. To avoid this variation, applicant have found that mounting imaging device 103 to the housing by securing it via its zooming lens 104 rather than by its module 110 is preferable because the module is typically formed of flimsy material, which deforms easily during installation. If the lens is aligned precisely relative to the housing/reflector, than the imaging device is aligned because the image device is optically coupled to the lens with high precision.

In one embodiment, the system 100 comprises an adjustment mechanism to enable the imaging device 103 to be adjusted to move the second axis relative to the first axis, and thereby account for manufacturing tolerances and anomalies in the various components. As mentioned above, it is important that the first and second axes be coincident. Although this can be accomplished in large part by precisely mounting the imaging device 103 relative to the reflective 101 as mentioned above, in one embodiment, an adjustment mechanism is used to tune the alignment of these axes.

The adjustment mechanism may be any known device for allowing relative movement among different components along at least one axis. Suitable mechanisms include, for example, set screws, pivots, ball and socket assemblies, hinges, swivels, trunnions, gimbals, turrets, cams, and combinations of such mechanisms.

Although means of adjusting the first axis to the second axis can differ and many approaches are possible within the scope of the invention, in one embodiment, the adjustment mechanism comprises an adjustment member. Movement of the adjustment member causes the lens 104 to move relative to the reflector 101. For example, the adjustment member may be a threaded member operatively connected between the lens and a cooperating member secured to the housing (or other structural component not connected to the lens). By turning the adjustment member, a screw mechanism will cause the lens to move relative to the cooperating member, thereby moving the lens relative to the reflector. Such an adjustment member may take on different forms, and it may be manual or mechanized (e.g. motorized, solenoid, magnetic, etc.)

Figure 2:
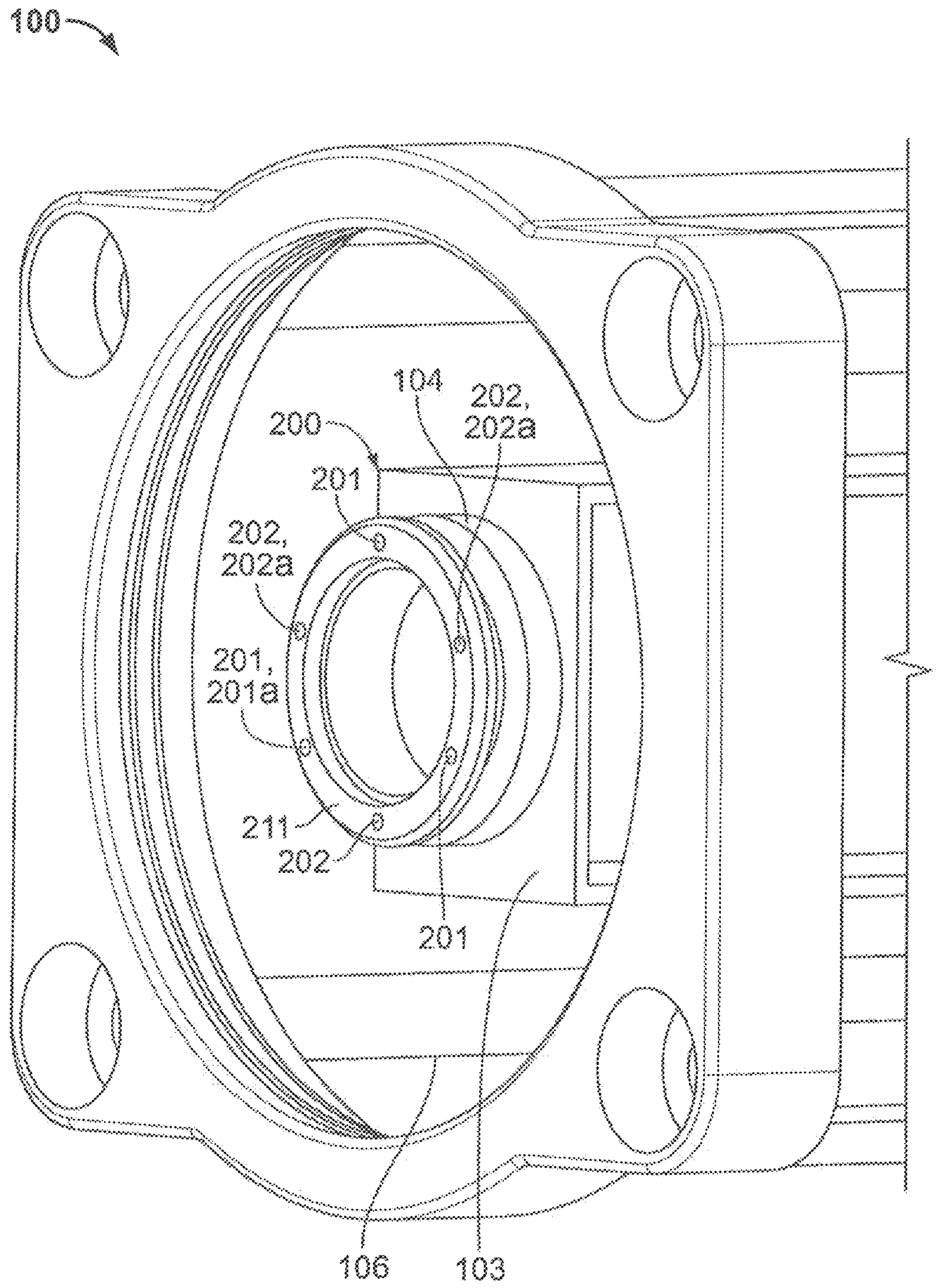
FIG. 2 shows a close up front view of the imaging head of FIG. 1.

For example, in the embodiment depicted in FIG. 2, the adjustment mechanism 200 comprises a bracket 211, two or more adjustment members 201 along the bracket's perimeter, and a compliant gasket (not shown) between the bracket 211 and the lens 104. In this embodiment, the adjustment members are adjustment screws or bolts 201*a* and the cooperating member is the bracket 211. The adjustment screws are tightened such that the lens 104 is pulled in toward the bracket 211 and against the complaint gasket. Because the complaint gasket can deform, the angle of the lens 104 relative to the bracket will be a function of the relative tension among the different adjustment screws 201. In other words, the second axis of the lens 104 may be adjusted by differentially tightening the various adjustment screws. Once the lens 104 is aligned such that its axis is coincident with the first axis, a plurality of set fasteners 202, which in this embodiment are set screws 202*a*, are screwed through the bracket 211 such that they urge against the lens 104. This way, the adjustment screws 201*a* are in tension and the set screws 202*a* are in compression, thereby stabilizing the lens 104 relative to the bracket 211 (and thus relative to the housing/reflector).

Figure 3:
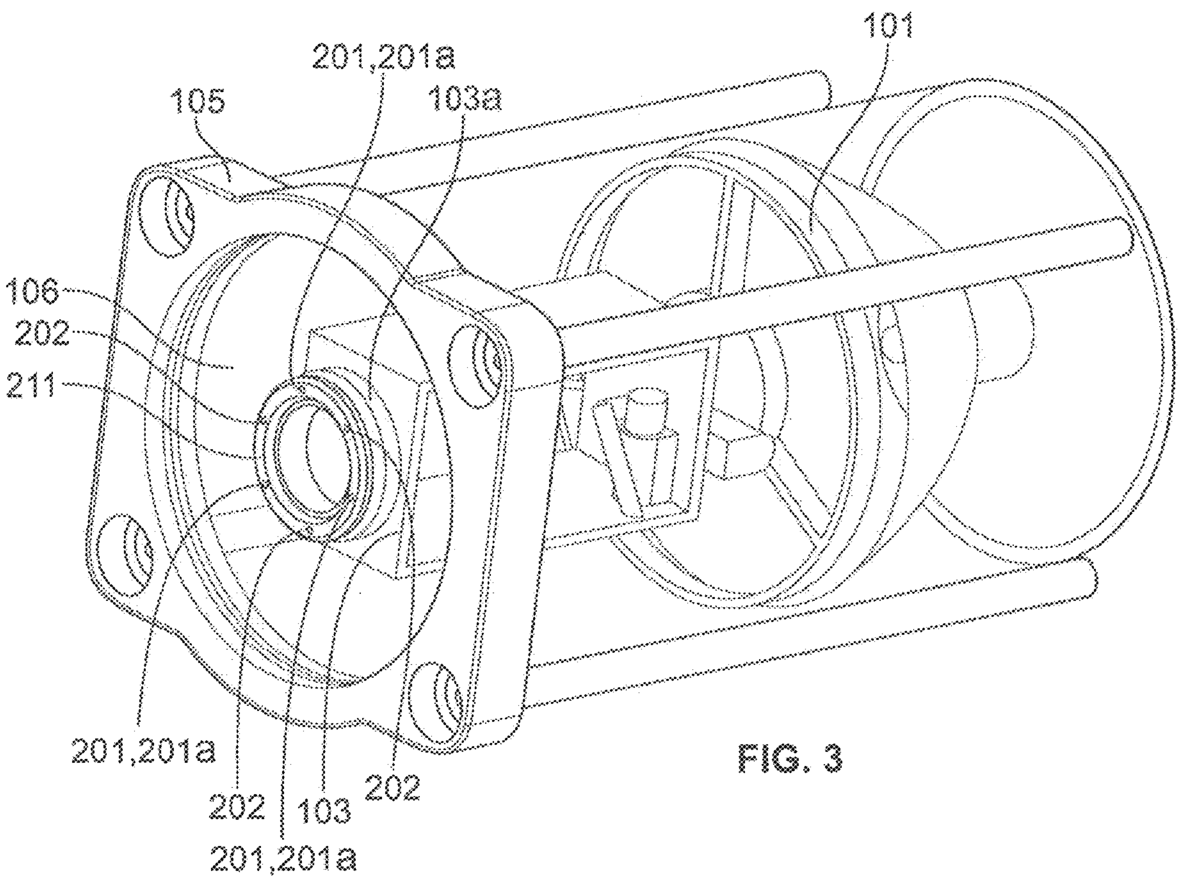
FIG. 3 shows an alternative embodiment of the imaging head of the present invention.
Figure 4:
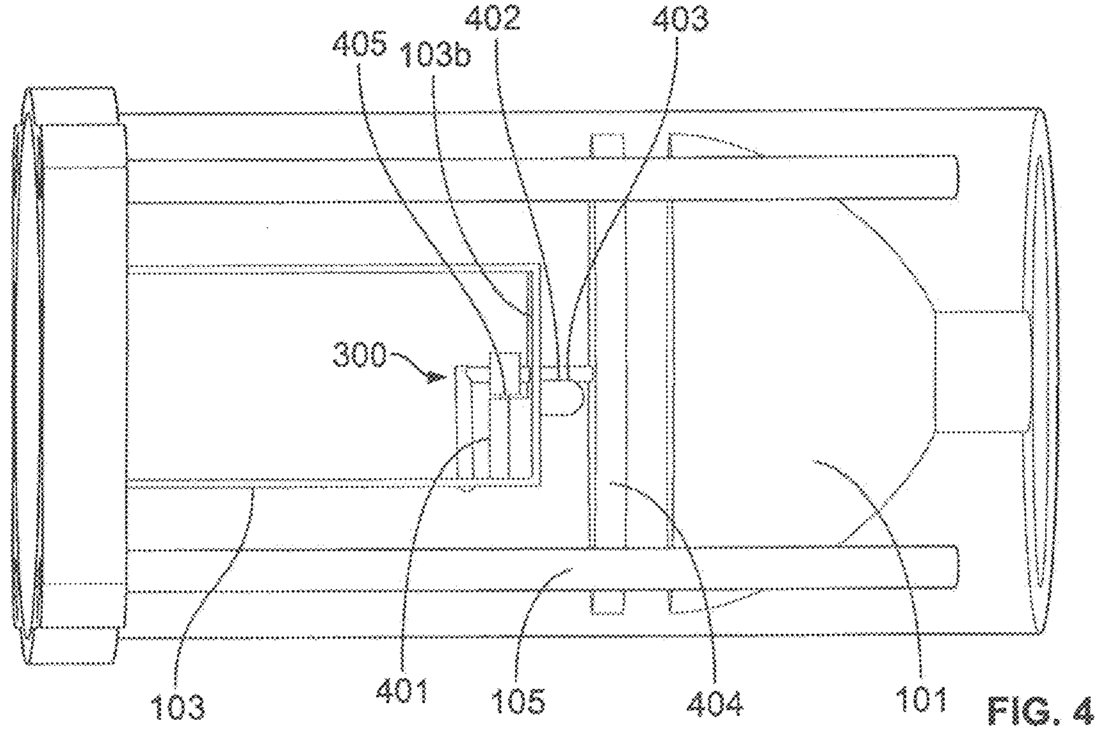
FIG. 4 shows a side view of the imaging head of FIG. 3.

In addition to or as an alternative to the adjustment mechanism 200, a second adjustment mechanism 300 is shown in FIGS. 3 and 4. This embodiment is essentially a pan-and-tilt mechanism, allowing the lens to pivot about a vertical axis and tilt up and down. Such pan-and-tilt mechanisms are well known and available in various configurations. Specifically, FIG. 4 shows motors 401 and 402 positioned perpendicular to each other to move the imaging device in two axes relative to the reflector. More specifically, in this particular embodiment, a bracket 404 is secured to either the housing or the reflector 101. In this embodiment, the bracket 404 is secured to the housing 105. From the bracket 404 extends an axle 403 to which the motors 401 and 402 are operatively connected. More specifically, motor 401 comprises an interface 405 engaged with axle 403 such that, when the motor 401 turns the interface 405, the rear 103*a* of the imaging device 103 moves vertically as the device is depicted in FIG. 4. Likewise, the motor 402 comprises a similar interface (not shown) to that of interface 405, which is also engaged with the axle 403, such that, when motor 402 rotates its interface, the rear 103*a* of image device 103 is moved horizontally as the device is shown in FIG. 4.

Another adjustment mechanism involves a single motor combined with a cam or an offset coupling. For example, referring to FIG. 6, a schematic of one embodiment of an adjustable means 600 is shown. As shown, the imaging device and lens are housed in a module 601. The front end 601*a* of the module is mounted to the front face 612 with a bracket 613, and held in place with a plurality of fasteners 615. As described above, a compliant gasket 618 is disposed between the module 601 and the front face 612 such that slight movement of the module 601 relative to the front face 612 is possible. (In this regard, it is preferable that the fasteners 615 not be overly tight.) Although a complaint gasket is used in this embodiment, it should be understood that other means of adjustably connecting the module 601 to the front face can be used such as, for example, a swivel or a gimbaled bracket having enough play to allow the assembly 601 to move about the first axis 108. A motor 603 is disposed in the housing in back of the assembly 601. The motor is attached to an offset coupling 610 having a shaft 604 that is offset from second axis 110 of the lens assembly. The shaft 604 is connected to the rear end 601*b* of the assembly 601. As the motor turns, the offset coupling will cause the rear of the module to oscillate. Given that the amount of required movement of the module is very small, a stepper motor or some kind of gear reduction or similar mechanism may be desirable such that the module moves slowly in response to the motor rotating. Still other embodiments for moving the module 601 will be known to those of skill in the art in light of this disclosure. For example, rather than using an offset coupling between the motor shaft and the assembly 601, a cam mechanism may be used.

Still other means of adjusting the imaging device relative to the reflector would be obvious to one of skill in the art in light of this disclosure. Additionally, it should be understood that the adjustment mechanisms described above may be mixed and matched or combined to form compound means of adjusting the second axis. Furthermore, although the adjustment mechanism are shown and described herein with respect to moving the imaging device 103, it should be appreciated that the first and second axes can be move relative to one another by adjusting the reflector 101 relative to the imaging device 103. In this respect, the same mechanisms used for adjusting the lens 104 could be applied instead to the reflector 101 to adjust the first axes. In yet another embodiment, both the imaging device 103 and the reflector 101 are independently adjustable.

Figure 6:
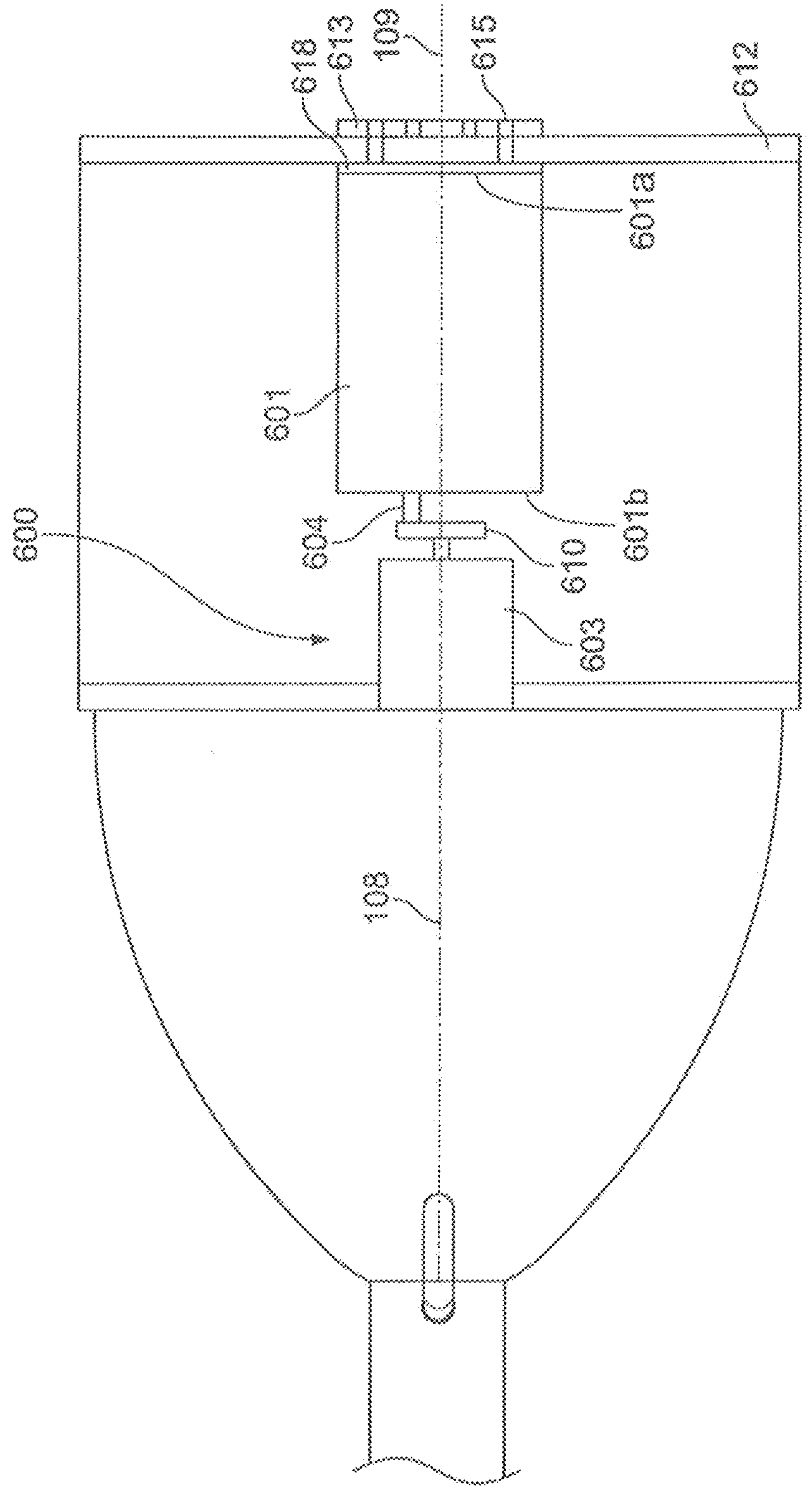
FIG. 6 shows an alternative embodiment of the adjusting mechanism.

The advantage of the embodiment of using one or more motors to adjust the imaging assembly as shown in FIGS. 3, 4 and 6 is that the adjustment mechanism can be actuated in situ, while the imaging system is being used. The movement of the motors may be controlled manually or automatically. More specifically, the motors may be controlled via an operator's control device as is well known in the art. Alternatively, the adjustment mechanism may be controlled automatically by one or more processors configured to determine the luminance of an image generated by the imaging device and to send a signal to actuate the adjustment mechanism until luminance is maximized. In such an embodiment, it may be preferable to configure the processor (s) to initiate the auto-adjust feature only after receiving a signal form the operator to avoid a situation in which the imaging device is attempting to focus, while the adjustment mechanism are being actuated.

Lamp Adjustment Mechanism

Figure 13A:
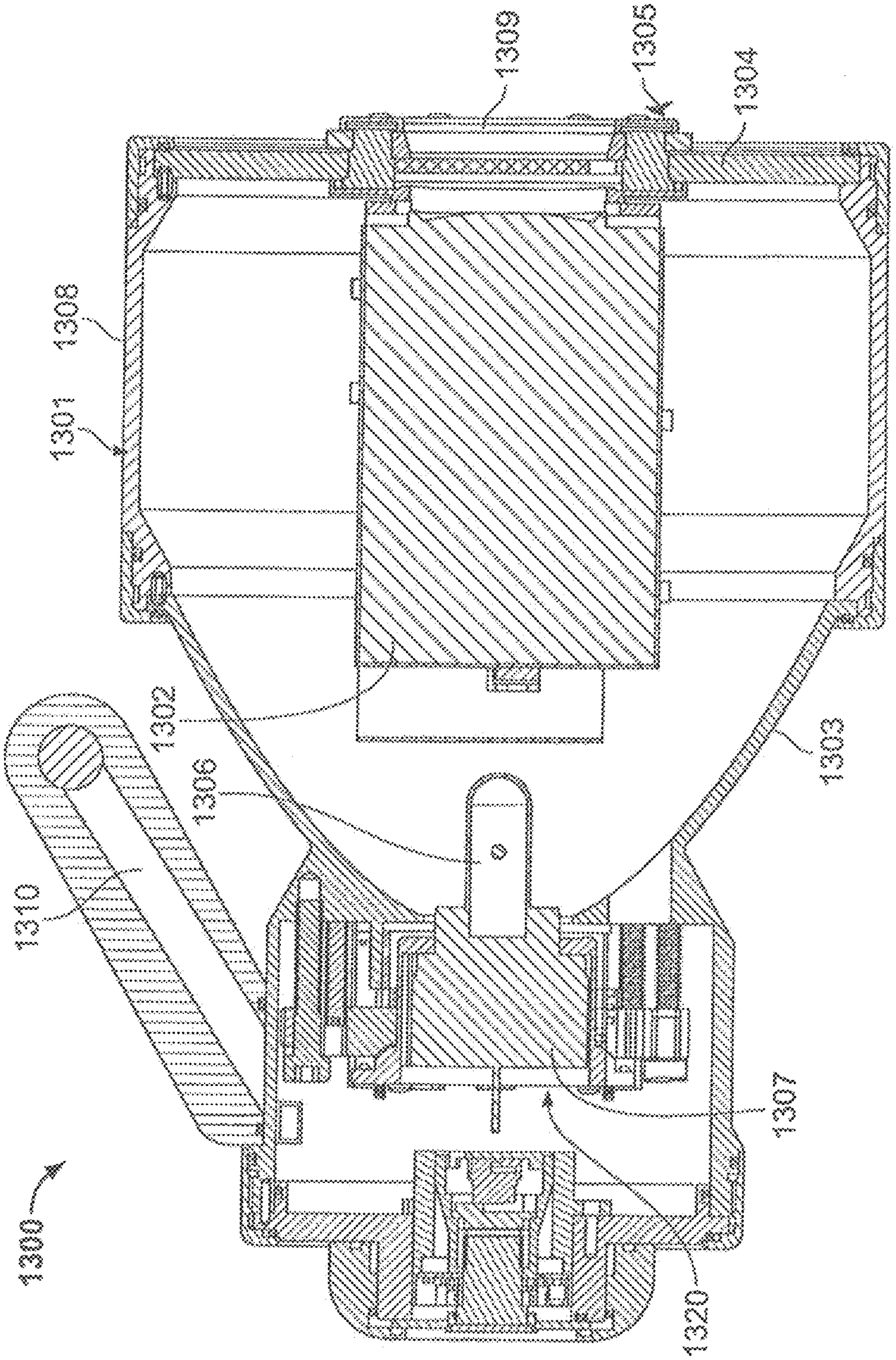
FIG. 13A is a cross sectional, side view of one embodiment of the imaging head of the present invention.
Figure 13B:
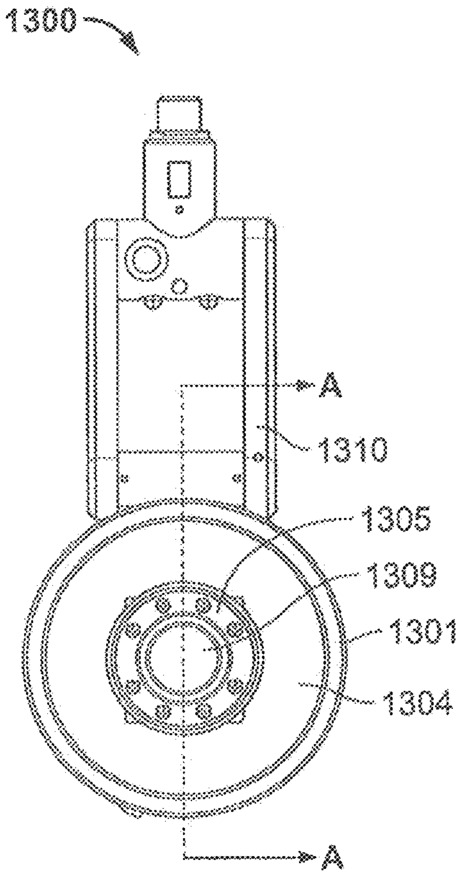
FIG. 13B is a front view of one embodiment show in FIG. 13A.

Referring to FIGS. 13A and 13B, a cross sectional view and front view of another embodiment of the imaging head 1300 of the present invention is shown. Specifically, the imaging head 1300 is similar in many respects to the embodiment shown in FIG. 5. The imaging head 1300 comprises a parabolic reflector 1303, which is an integral part of the housing 1301. In this particular embodiment, the housing comprises the parabolic reflector 1303 in combination with a cylindrical housing component 1308. As in the embodiment of FIG. 5, this embodiment also comprises a transparent face 1304 to which, the imaging device 1302 is secured. Like the embodiment in FIG. 5, this embodiment comprises an imaging device alignment mechanism 1305 which may operate as described above. A lens 1309 protects the imaging device 1302 from the environment.

In the embodiment of FIGS. 13A and 13B, the lamp 1306 is secured in a lamp assembly 1320. The lamp assembly 1320 not only provides the electronics to drive/operate the lamp 1306 such as, for example, ballast 1307, but also provides for an alignment mechanism to ensure that the lamp 1306 is precisely aligned in the parabolic reflector 1303 to optimize performance. That is, Applicants have discovered that manufacturing variations in the lamp 1306 impact the lamp shape and location of light discharge point 1306*a* within the lamp 1306. These variations are significant enough that lamps will have significantly difference performance for a given reflector configuration is not adjusted. For example, one lamp may function nicely within a parabolic reflector, producing a concentrated and bright light pattern, but a different lamp in the same reflector may result in a diffuse light pattern that is incapable of propagating a long distance down a pipe. Therefore, Applicants recognize the need to "tune" each lamp 1306 for optimum performance in the parabolic reflector 1303.

Applicants also recognize that tuning each lamp 1306 in situ in each head 1300 is not practical. Because the life of the lamp 1306 is limited compared with the rest of the system, replacement of the lamp is inevitable. However, requiring that each lamp be tuned for a particular reflector cannot realistically be done in the field because of the skill and tooling required. On the other hand, it is not commercially practical for a user to ship a unit back to the factory every time the lamp needs to be replaced. Field repair is a practical necessity.

Rather than tuning each lamp in situ, Applicants developed a lamp assembly 1320. The lamp assembly is a modular unit that can compensate for the variations in the manufacturing of the lamp 1306, such that, when the lamp assembly 1320 is secured to the housing 1301, the position of the light discharge point 1306*a* in the lamp 1306 will be precisely position relative to the parabolic reflector 1303.

Figure 14A:
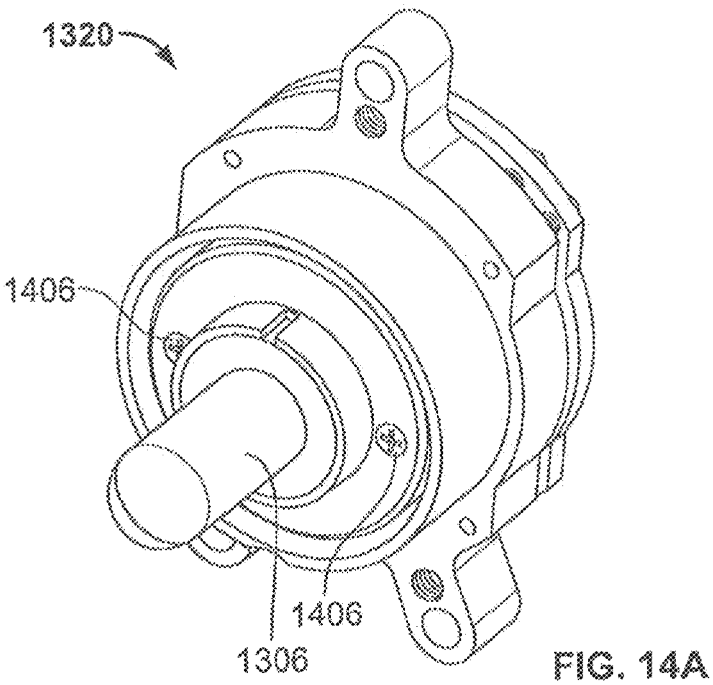
FIGS. 14A and 14B are front and back perspective views of the lamp assembly.
Figure 14B:
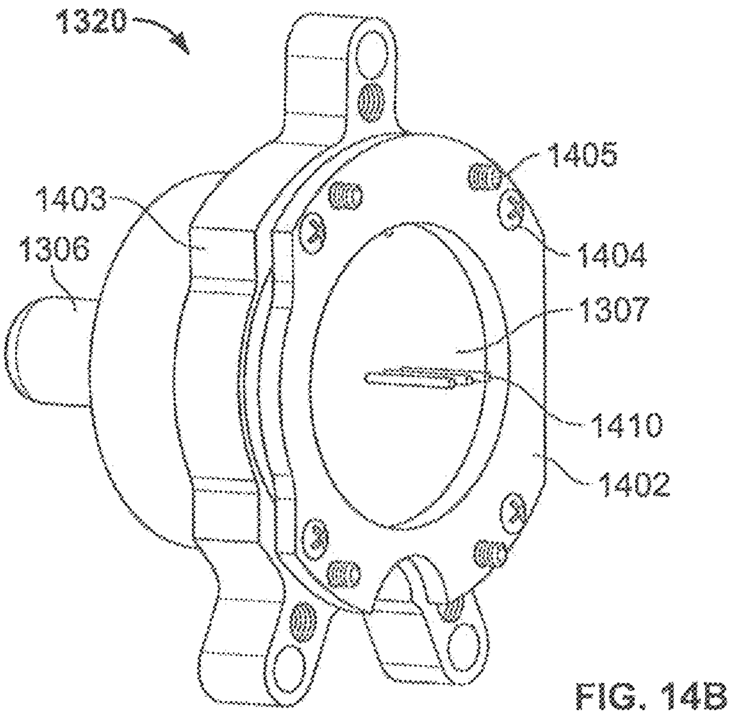

Referring to FIGS. 14A and 14B, one embodiment of the lamp assembly 1320 comprises the lamp 1306 and the ballast 1307, which has the appropriate electrical interface 1410. The ballast 1307 is held by a first bracket, which, in this particular embodiment, is a ballast holder 1402. The ballast holder 1402 (and the ballast 1307 and lamp 1306 it contains) is secured relative to the reflector 1303 by a second bracket, which, in this particular embodiment, is base 1403.

The position of the ballast holder 1402 can be adjusted relative to the base 1403. Specifically, a series of first adjustment screws 1405 enable the ballast holder 1402 to be adjusted independently from the base 1403. A series of set screws 1404 secure the position of the ballast holder 1402 to base 1403 once the appropriate relative position therebetween is established.

Figure 15:
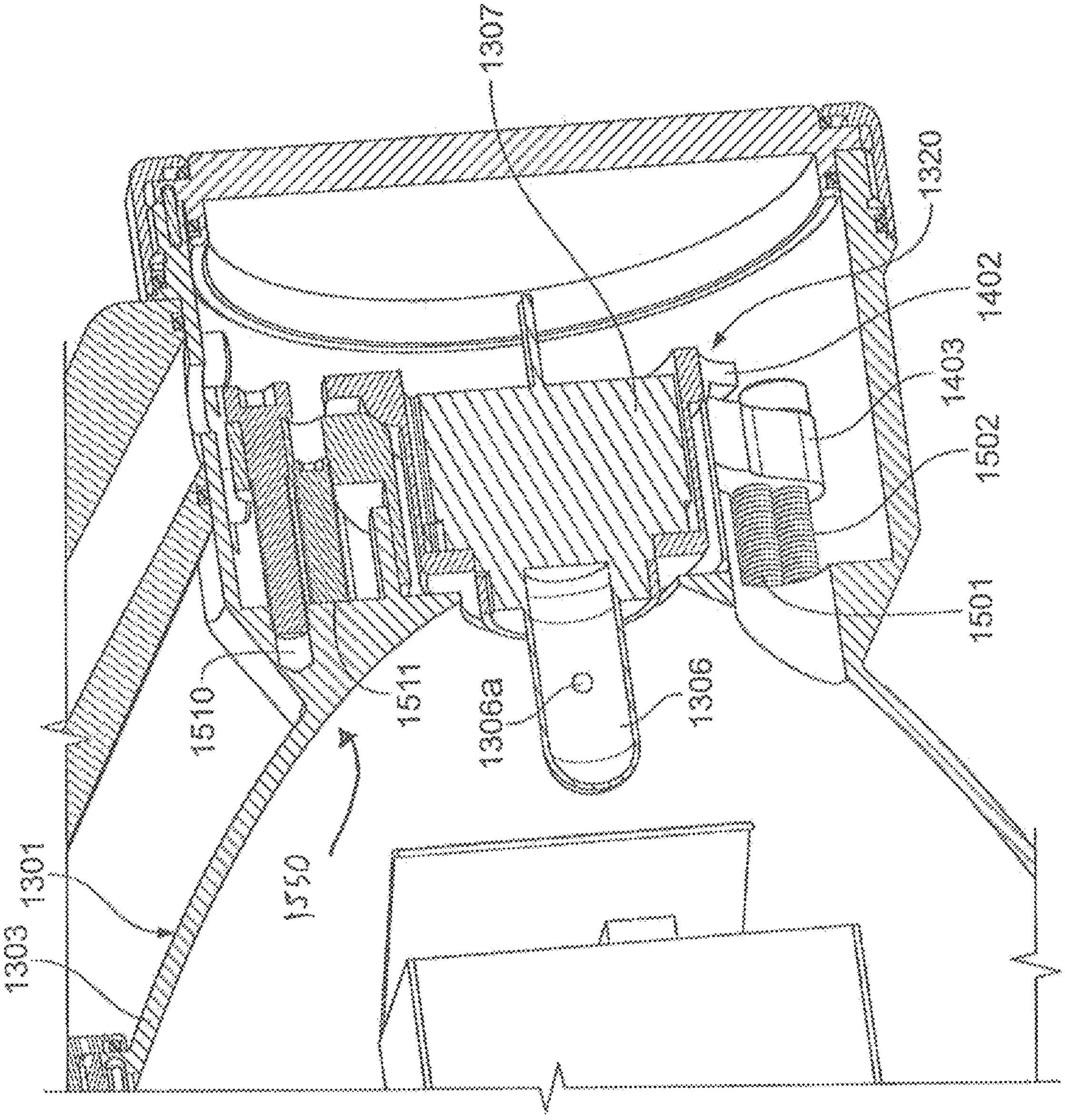
FIG. 15 is a magnified, cross sectional, perspective view of the lamp assembly of FIG. 14A in the imaging head of FIG. 13A.

Referring to FIG. 15, a cross sectional, magnified view of the mechanical interconnection between the lamp assembly 1320 and an interface portion 1550 of the housing 1301 is shown. In this embodiment, the interface portion 1550 comprises bolt holes 1510 and a register surface 1511. The interface portion 1550, in this embodiment, is integral with the base of the reflector 1303.

As shown in FIG. 15, the mechanical interengagement involves a multitude of second adjustment screws 1501 which can be moved up and down to adjust the relative position of the base (and thus the ballast holder and its contents) relative to the housing 1301. Once a desired position is obtained, set screws 1502 are screwed in place to hold the relative position of the base to the housing 1303.

From this description, it should be clear that there are essentially two points of adjustment of the lamp 1306 (and more particularly the light discharge point 1306*a*) with respect to the parabolic reflector 1303. First, there is an adjustment of the lamp relative to the base 1403 via the adjustment screws 1405, and second, there is the adjustment of the base 1403 relative to the housing 1300 via the adjustment screws 1501.

Rather than adjusting the first adjustment screws 1405 in the ballast holder 1402 and the second adjustment screws 1501 of the base in the field where the ability to measure the light output and pattern may be compromised or inconvenient, Applicants have devised a system of pre-adjustment that avoids the need for field tuning. Specifically, the adjustment screws 1405 and 1501 are set in a factory setting where the light output of the lamp 1306 in the parabolic reflector 1301 can be optimized. This can be done because the interface 1550 for the lamp assembly 1320 at the base of the reflector is highly repeatable and precise relative to the reflector (i.e., the bolt holes 1510 and register surface 1511 can be machined with a great deal of precision and accuracy). Thus, once the lamp assembly 1320 is adjusted and optimized for a given lamp 1306 having a unique light discharge point 1306*a*, the lamp assembly 1320 can be placed in any housing 1301 and achieve essentially the same optimized output.

In one embodiment, the process for adjusting the lamp assembly 1320 involves first establishing the axial position of the lamp 1306 relative to the parabolic reflector 1303. This is done by disposing the base 1403 on an interface 1550 (or a mock-up of an interface for purposes of performing the calibration), and moving adjustment screws 1501 in and out relative to the parabolic reflector 1303 (or a mock-up reflector). Once the light pattern projected by the parabolic reflector 1303 reaches a minimum, set screws 1502 are used to secure the axial position of the lamp assembly 1320 relative to the parabolic reflector 1303. It should be appreciated that because the reflector is parabolic, the light pattern emanating from it will have a minimum at which point moving the light discharge point 1306A in or out will cause the light pattern to expand.

Once the axial position of the lamp assembly 1320 is established, the adjustment screws 1405 are used to alter the radial position of the light discharge point 1306A within the parabolic reflector 1303. To this end, the plurality of adjustment screws 1405 are manipulated until the relatively bright point of light in the light pattern is brought to the center of the light pattern. This relatively bright point corresponds to the light discharge point 1306A. Once the relatively bright spot is centered in the pattern, the set screws 1404 are screwed in place to secure the ballast holder 1402 relative to the base 1403. At this point, the base can be unscrewed from the interface by backing out set screws 1502 (but leaving the adjustment screws 1501 in place) and the lamp assembly 1320 can then be placed in a different housing having the register surface 1511 and bolt holes 1510 to accommodate the set screws and adjustment screws and thus can readily be installed in the field. To ensure that the adjustment screws 1405 and 1501 remain in place, it is preferred to inject a thread sealant (e.g., LockTight®) or similar product into the threads to ensure no relative movement of the adjustment screws.

It should be understood that the lamp assembly 1320 is just one embodiment and that other embodiments are possible within the scope of the invention to adjust the lamp 1306, and more particularly, the light discharge point 1306A within the parabolic reflector 1303 to maximum light output.

Power Supply

As mentioned above, because the device uses light efficiently, the demand for power is reduced. This power reduction may result in a thinner power cable being used, or the use of local battery power rather than a remote power supply. In one embodiment, the reduced power requirements facilitate the use of one or more batteries 107 as shown in FIG. 1. The batteries 107 may be used to power the lamp 102 and the imaging device 103 such that no power cable is required. In such an embodiment, power no longer needs to be conducted down a long cable, thus eliminating energy loss due to voltage drop along the length of the cable, and further improving the efficiency of the system. The power savings therefore synergistically result in reducing the weight of the device, increasing its maneuverability, and simplifying its manufacture. In one embodiment, the batteries 107 are rechargeable such that, between uses, the device can be plugged into a charger, thereby eliminating the need to change the batteries 107. It should be understood, that although the present invention lends the imaging system to battery power, the power may still be provided remotely by an independent source.

Second Imaging Device

Figure 16:
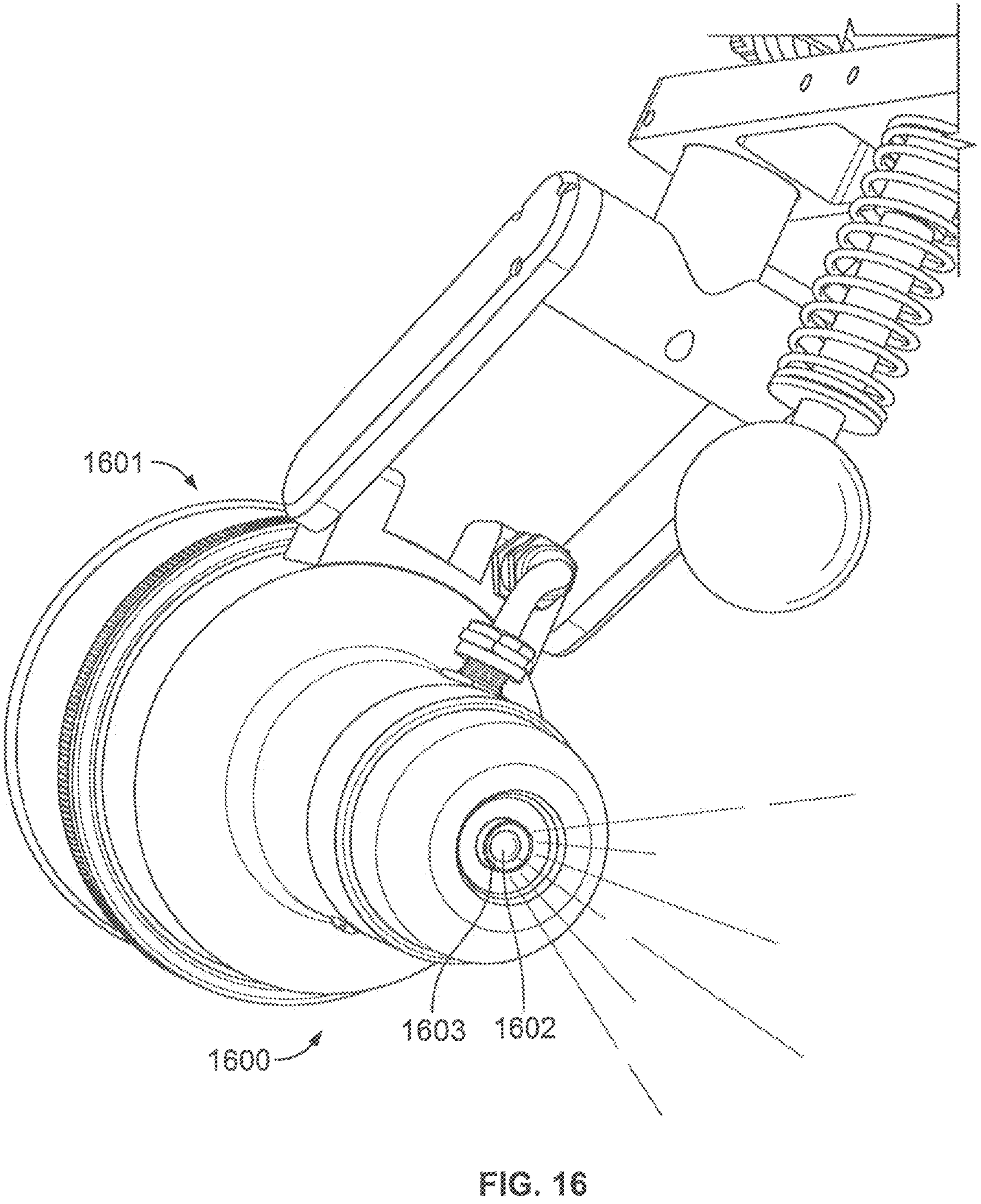
FIG. 16 is a view of the second imaging device of the imaging system of the present invention.

In one embedment, it may be preferable to use a wide angle camera for filming nearby objects with a panoramic view. Accordingly, the second imaging device may comprise a short field of view lens assembly and one or more LED lights for illuminating the field around the second camera. For example, referring to FIG. 16, a second imaging device 1600 is shown on the rear facing end of the imaging system 1601. This particular embodiment of the second imaging device 1600 comprises a wide angle lens assembly 1602 and an array 1603 of LEDs encircling the lens assembly 1602 to provide the necessary illumination.

Positioning and Support Systems

As mentioned above, the imaging system of the present invention may be used in a variety of applications, including, for example, pipe inspection, cinematography, and long-distance filming or monitoring such as from a helicopter. For illustrative purposes, the imaging system of the present invention will be considered in detail with respect to pipe inspection. The system is particularly well suited for this application because the imaging system can be retrofitted in existing systems such as the Quick View® devices available through Envirosight LLC and described in U.S. Pat. No. 7,480,041. Specifically, the imaging system described herein can be substituted for the imaging head described in the '041 patent. Accordingly, the description of the support system, positioning system, and measuring system in the '041 patent is incorporated herein by reference. For convenience, portions of that disclosure are restated herein with figure numbers and reference numbers modified to correspond with the present application.

Referring to FIG. 8, the support system 802 is a portable system and functions to support the functionality of the imaging head 801. Supporting the functionality of the imaging head requires providing the imaging head with power and control signals. To this end, a preferred support system comprises a power supply 809, operator's control 811, and monitoring/recording functionality 810.

Figure 10:
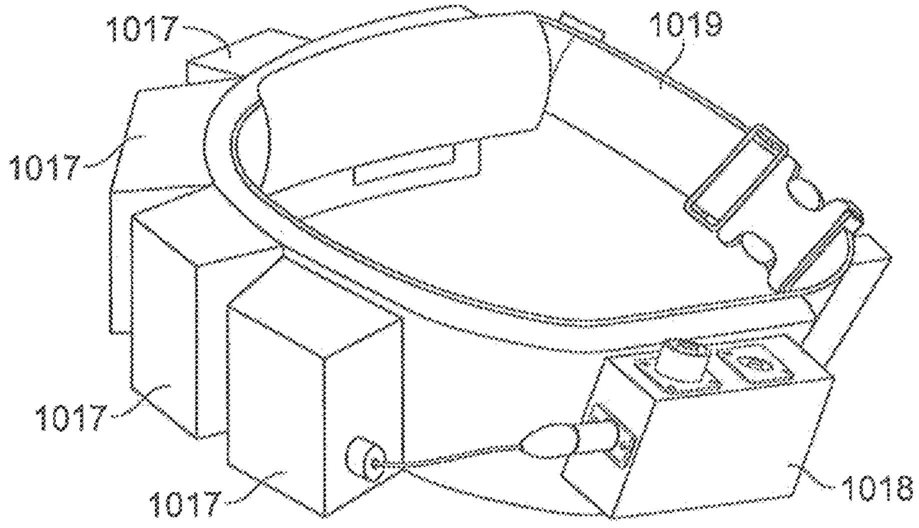
FIG. 10 shows the belt of the embodiment shown in FIG. 7.

In one embodiment, the power supply and operator's control are mounted on a belt 19, as shown in FIG. 10, which is adapted to be worn by the user. Alternatively, a vest may be used. The power supply 809 supplies power to the imaging head and to other components of the support system requiring power. In one embodiment, the power is supplied by one or more rechargeable batteries releasable mounted to the belt 1019 as shown in FIG. 10. Given the weight of batteries, particularly wet cells, it may be preferable under some circumstances to place one or more batteries on the ground during operation of the inspection system. Although rechargeable belt-mounted batteries are preferred, power may be provided through other conventional means such as a portable generator. Also, it should be understood that, in the embodiment of FIG. 12, the imaging system comprises local batteries, thereby obviating the need to providing power to the imaging head.

Figure 9A:
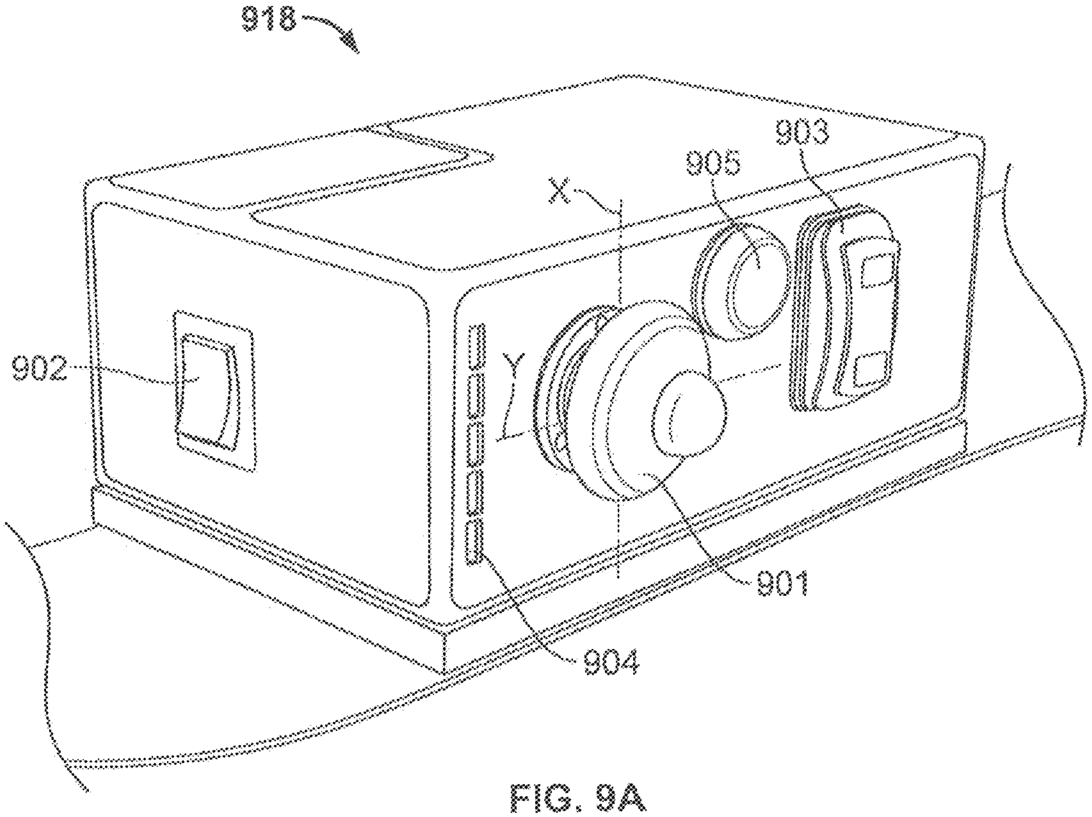
FIGS. 9(A) & (B) show different perspective views of the operator's control in one embodiment of FIG. 1.
Figure 9B:
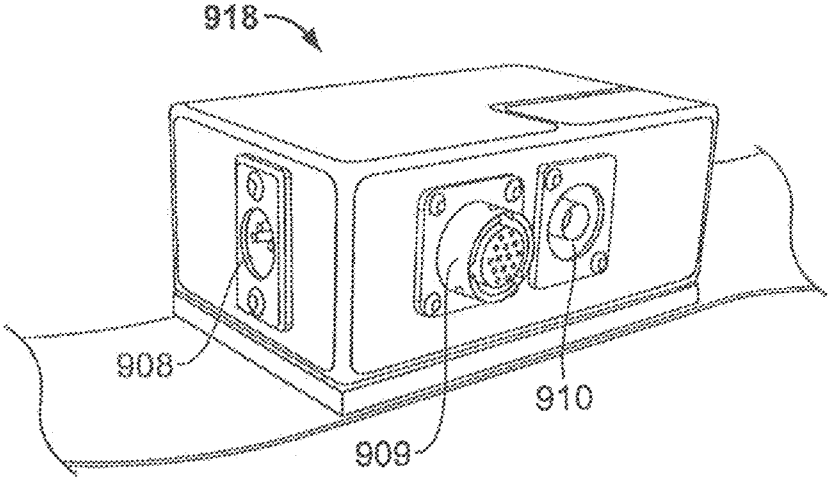

In one embodiment, the operator's control is used to control the on/off operation of the imaging device as well as the other functions such as magnification, manual focus and shutter speed, and lights. In one embodiment, this control functionality is integrated into a single enclosure as shown in FIGS. 9(A) and 9(B). This enclosure is adapted to be mounted to the belt 1019 as shown in FIG. 10.

As shown, the operator's control 918 comprises controls for power, zoom, focus, and lighting, and a monitor for battery life monitor. Specifically, the power to the imaging head is controlled by switch 902, and a series of LEDs 904 are used to provide an indication of battery life.

In one embodiment, a single joystick 901 is provided to control both the magnification and manual focus. Specifically, the joystick is actuateable along perpendicular x and y axes, such that movement along the one axis controls the zoom while movement along the other controls the focus. As view in FIG. 9(A), movement along the x axis in one embodiment controls focus, while movement along the y axis in one embodiment controls zoom. In one embodiment, the joystick 901 is actuateable perpendicular to the x and y axes to switch the imaging head between auto and manual focus. This allows the user to simply push down on the joystick to switch between the functions.

In one embodiment, the operator's control also comprises a switch 905 for controlling the light sensitivity of the imaging device. This is a known feature (see above shutter control functionality 807 mentioned above), which allows the imaging device to image a target in the event of diminished lighting conditions or shadows.

FIG. 9B is the other side view of the operator's control and shows the power input 908 to supply power to the various control functionality, and an input 909 for the video signal from the imaging head, a video output 910 to the monitor/recorder/frame grabber (described below).

The operator's control comprises a circuit board that interfaces the various control functionality and transmits commands to and receives acknowledgments from the imaging head. In one embodiment, the circuit board comprises a programmable controller (IC1A). The programmable controller provides for configurable control functionality where the function of the switches described above may be reconfigured through a simple software or firmware change. Although the control functionality may be hardwired directly to the imaging head, interfacing the imaging head through a circuit board having a programmable controller is preferred from a flexibility standpoint. Additionally, the communication link between the control functionality and the imaging head may be metallic or wireless.

Figure 11:
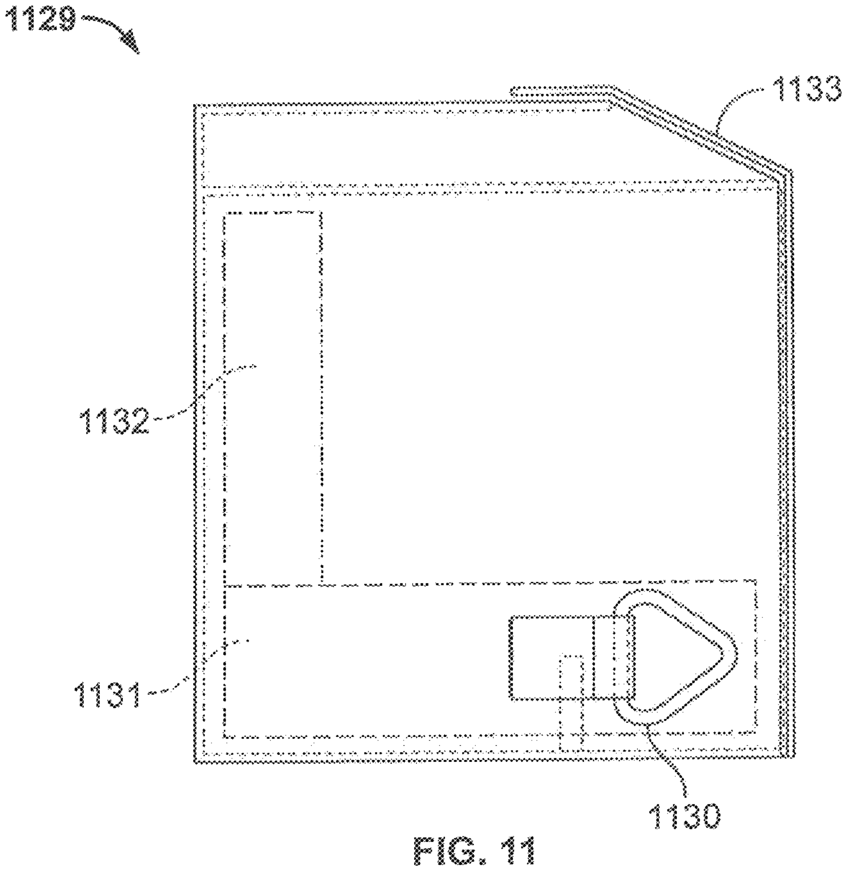
FIG. 11 shows a bag for supporting a monitor/recording device.

Referring back to FIG. 8, the output device 810, in one embodiment, comprises a monitor, which allows the user to view the images being transmitted by the imaging head in real time. Such a function is highly preferred as it provides feedback to the user as he or she positions the imaging head. Monitoring devices are well known in the art. In one embodiment, the imaging head is lightweight and supported in such a way as to allow the user to view it conveniently while operating the positioning system. In one embodiment, the monitor is worn around the user's neck. In one embodiment shown in FIG. 11, the monitor is contained in a bag 1129 or similar device to provide shielding from the sun to improve visibility and reduce glare. For example, the monitor/recording functionality may be supported by a bag 1129 as shown in FIG. 11 adapted to be worn around the user's shoulders/neck. The bag 1129 in one embodiment has a hook & loop fastened flap 1133 and is configured to support a recording device 1131 and a monitor 1132 (shown in dotted lines).

In one embodiment, the output device 810 comprises a recording device for recording one or more images for evaluation later. In one embodiment, the recording device is a digital frame grabber. The frame grabber is adapted to convert an analog signal to a digital image and conveniently store the image on a computer-readable medium such as a disk. The images may be still images or video images. Images may be stored, for example, in JPEG or a bitmap format, which is readily-transmitted over conventional telecommunication links anywhere in the world without loss of resolution. It has been found that having images in such a readily-transmittable form provides others, who need not be on-site, with the opportunity to analyze the images and determine whether an invasive procedure is required while personnel are on site and in position to perform such a procedure.

In one embodiment, the monitor and frame grabber are integrated into a single unit to provide for a conveniently transportable package. Suitable monitors/frame grabbers are commercially available from, for example, Sony Company (Model No. HD700), or, in the form of laptop computers (e.g., Archos 500) or other custom devices.

Alternatively or additionally, another type of recording device may be used. For example, it may be preferable under certain circumstances to use a video tape recorder. Suitable monitor/tape recorders are commercially available from, for example, Sony Company (Model No. GV-D900).

The positioning system 803 functions to position the imaging head 1215 to image the desired area or target. Since the inspection system of the present invention is intended to inspect hard-to-reach areas or areas, which are generally inaccessible to humans, it is preferable for the inspection system to be highly maneuverable. In one embodiment, the positioning system comprises a support 812, which, in one embodiment, is an elongated member, which has the head of the imaging head mounted on one thereof. With such a configuration, a user can insert the head into, for example, a pipe, and manipulate it to position the imaging head such that the target area is in its field of view. In a more preferred embodiment, the elongated member 1214 is a telescoping boom as shown in FIG. 12.

Figure 12:
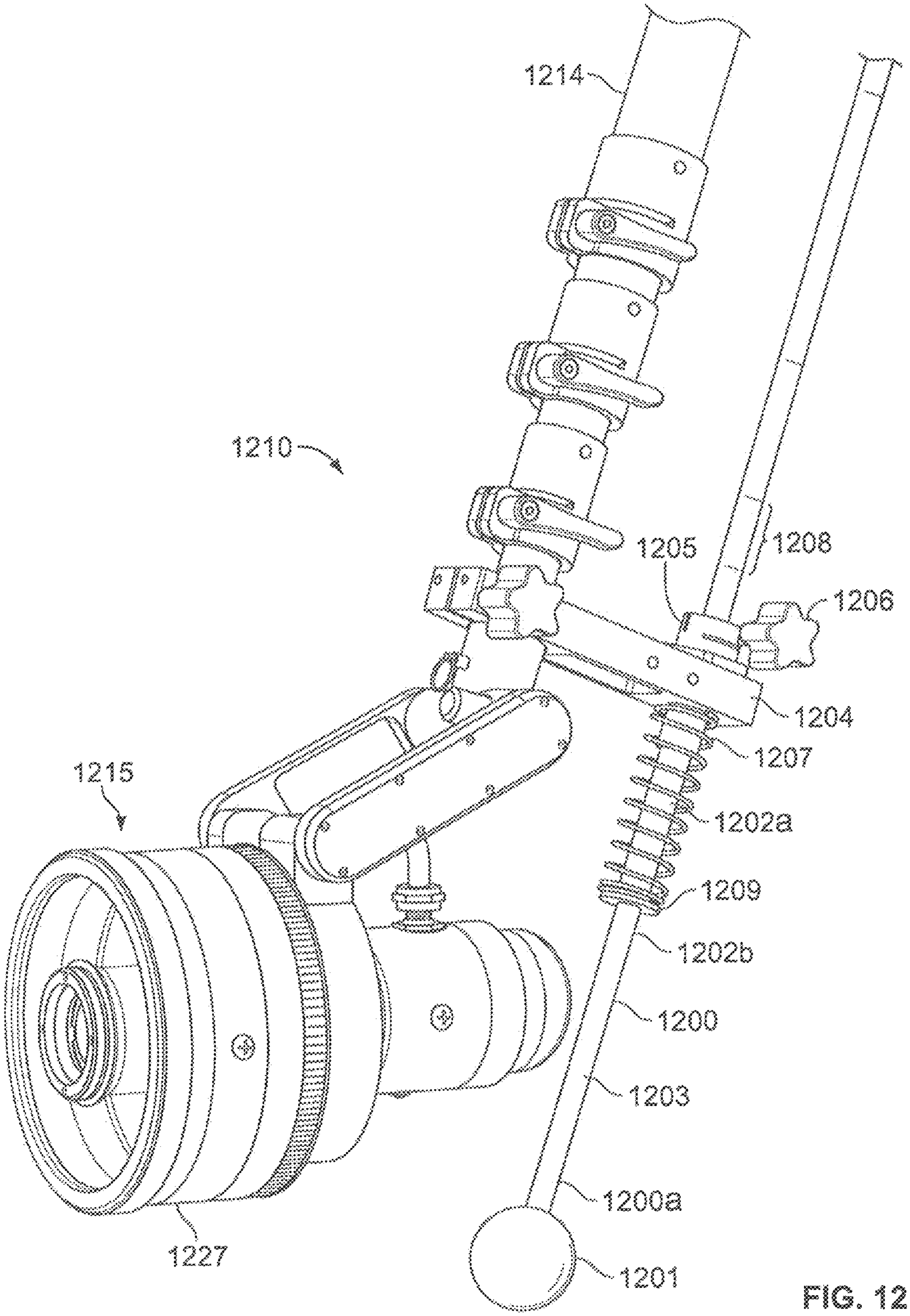
FIG. 12 shows a close up perspective view of the imaging head with targeting fixture.

In one embodiment, the positioning system comprises a targeting fixture 1200 extending outwardly from the imaging head (see FIG. 12). The targeting fixture 1200 comprises a distal end 1200*a* which is biased outwardly from the head 1227 such that, when pushed against a rigid surface, the distal end moves resiliently thereby effectively adjusting the position of the imaging head 1215 relative to the surface. By gradually pushing down on the device 1210, the imaging head 1215 is lowered in a controlled way to reach the sweet spot. Once the sweet spot is found, the user holds the device 1210 with the spring in the loaded position. It has been found that this provides an extremely reliable method of finding and maintaining the head in the sweet spot. In one embodiment, the distal end 1200*a* comprises a bulbous portion 1201 to increase its surface area in a direction normal to its biasing so that it does not penetrate, slip or shift upon the surface upon which it is placed. The distal end 1200*a* may extend essentially parallel to the elongated member 1214 or it may extend at an angle. For example, in some applications it may be useful to have distal end extend perpendicularly from the elongated member to allow the distal end to find purchase on a ledge or other structure element along a vertical pipe.

In one embodiment, the targeting fixture 1200 comprises a bracket 1204 effectively connected to the elongated member 1214, a rod 1203 having the distal end 1200*a* and being slideably held by the bracket 1204, and resilient means 1207 for biasing the distal end away from bracket 1204. The resilient means may be a spring (coil), electrometric material, or compressed fluid (such as air). In the embodiment shown in FIG. 12, the rod 1203 comprises an outer tube 1202*a* which is slideable through bracket 1204 and which is fixed to a clamp 1205. The outer tube 1202*a* extends through the spring 1207 and supports a flange 1209. The spring 1207 is thus captured between the bracket 1204 and the flange 1209. The inner rod 1202*b* is slideable within the outer tube 1202*a* and its distal end is biased away from the bracket 1204 by the spring 1207.

Alternative embodiments include gas/air pistons such as the type used in closing doors.

Figure 19:
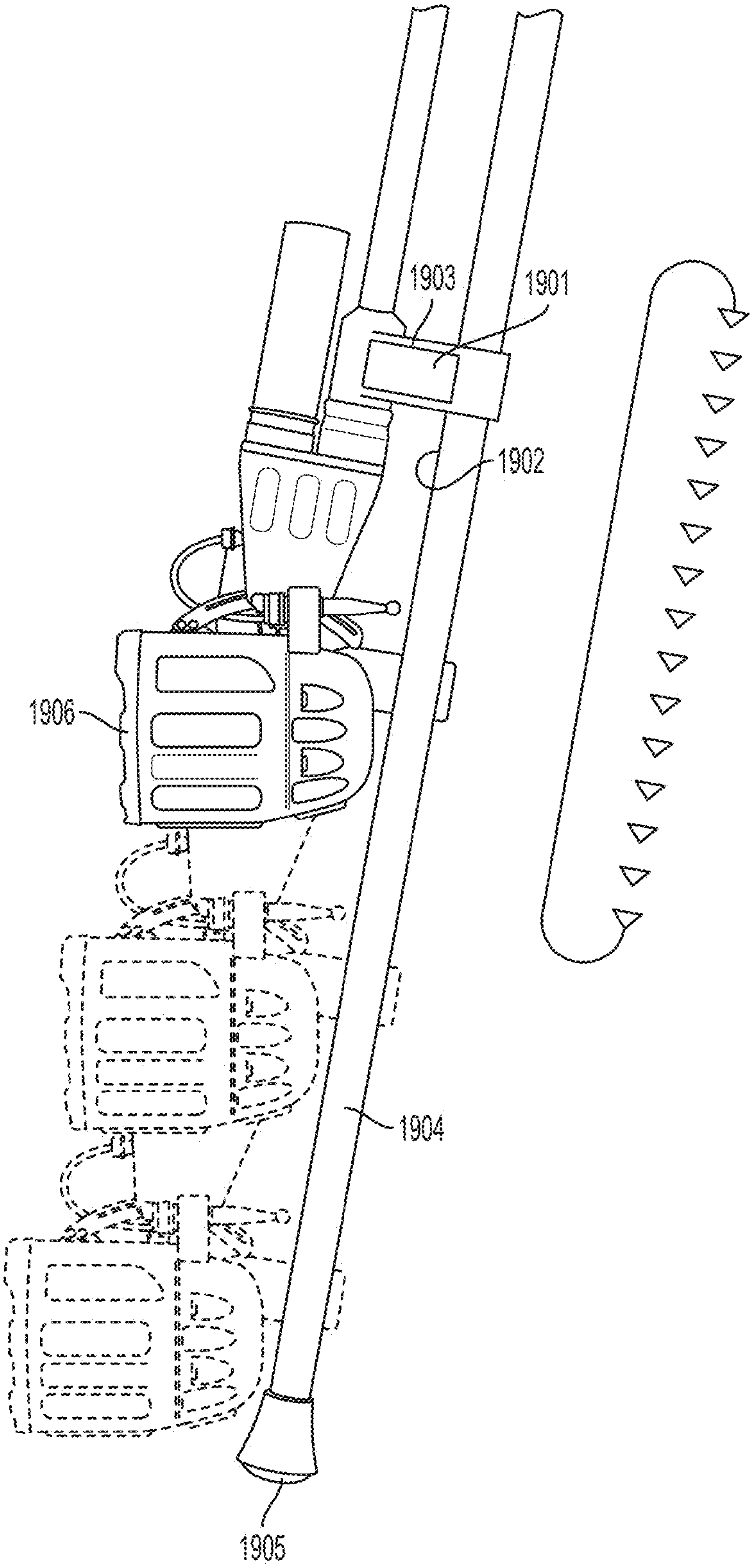
FIG. 19 shows an inspection system having a positioning system with a ratchet mechanism.

Referring to FIG. 19, in one embodiment, the positioning system comprising a ratchet mechanism 1901 and a targeting fixture 1904, the targeting fixture having a distal end 1905 and a resilient member (described above) for applying a biasing force to bias the distal end outwardly from the imaging device 1906. The ratchet mechanism 1901 is configured such that, as the distal end 1905 is push toward the imaging device against the biasing force, the ratchet mechanism incrementally ratchets up the distal end to prevent the distal end from returning to its extended position away from the imaging device. In one embodiment, the ratchet mechanism is configured to release the targeting fixture once the distal end is pushed in toward the imaging device to a certain point.

In one embodiment, the ratchet mechanism comprises a teeth 1902 (see also close up view in FIG. 20) along the targeting fixture 1904 and a pawl (inside housing 1903) for interengaging with the teeth.

Figure 20:
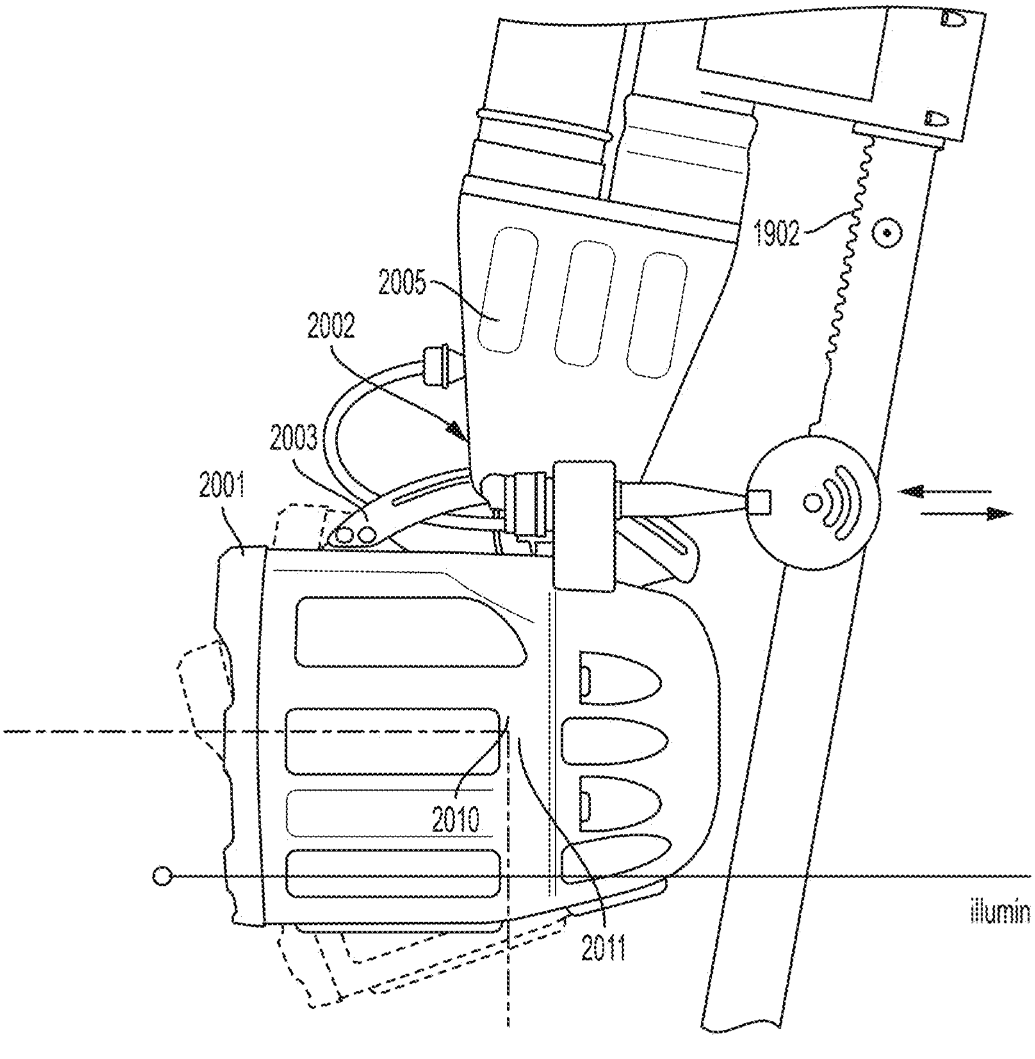
FIG. 20 shows an inspection system with tilting mechanism.

Therefore, the positioning system of the embodiment of FIGS. 19 and 20, provides two levels of positioning. A first level is a relatively coarse positioning involving the ratcheting feature described above—i.e., the distal end is ratcheted inwardly until the desired approximate length of the distal end from the imaging head is achieved. At this point, a finer positioning system is used—i.e., the resilient member is compressed to position the imaging head precisely where the user desires. In one embodiment, when the amount of compression exceeds the travel or stroke of the resilient member, the targeting fixture is ratcheted inward, thereby allowing the resilient member to return to its extended position to facilitate compression.

The targeting fixture 1200 is in one embodiment adjustable to allow for different sized pipes. That is, since the distance between the sweet spot and the wall of the pipe will change for different sized pipes, the position of the distal end will need to change too. In one embodiment, the targeting fixture is configured with a great deal of "stroke" in which the distal end 1200*a* would extend outward a distance sufficient to accommodate the largest anticipated pipe and then be capable of being pushed inward to accommodate the smallest anticipated pipe. Alternatively, the targeting fixture may be adjustable in a coarse sense to approximate the diameter of the pipe and then be fine tuned by depressing resiliently the targeting fixture to realize the sweet spot.

With respect to this latter configuration, one embodiment is shown in FIG. 12 in which the rod 1203 has calibration marking 1208 corresponding to different diameter pipes. A clamp 1205 is fixed to the outer tube 1202*a*, and a clamp screw 1206 is provided for securing to the inner rod 1202*b*, thus capturing spring 1207 and interconnecting outer tube 1202*a* and inner rod 1202*b*. This positions the distal end 1200*a* in a predetermined relationship relative to the imaging head 1215 while allowing repositioning of the distal end 1200*a* within the range of travel permitted by the spring 1207.

In operation, the user may preset the targeting fixture to the diameter of the lateral pipe by tightening the clamp 1205 at the marking 1208 corresponding to the pipe diameter—e.g., 8, 12, 15 and 18 inches. The markings are set so that the lamps 22, 23 will be slightly above the center of the pipe initially when the distal end is seated against the wall of the pipe. The user then pushes down on the device to advance the bracket 1204, thereby loading the spring 1207 by compressing it against flange 1209, and lowering the head 1227 until the sweet spot is found.

In one embodiment, the positioning system comprises an articulated mechanism 213 interposed between the enclosure of the imaging head and the boom to allow the imaging head to move relative to the boom. This articulated mechanism, in one embodiment, is a trunnion assembly 1228 having an axis perpendicular to the axis of the boom as shown in FIG. 12. A simple trunnion is preferred because it provides for independent movement of the imaging device without incurring the cost, weight and complexity of a traditional pan and tilt mechanism, although such mechanisms are nevertheless within the scope of the invention.

Referring to FIG. 20, another embodiment of the tilting mechanism 2002 of the present invention is shown. Here, the zooming lens of the imaging device defines a certain position point 2010 within the head housing 2001. The tilting mechanism 2002 is operatively connected between the housing 2001 and the positioning system 2005. The tilting mechanism is configured to tilt the housing relative to the position system such that the housing pivots around the position point 2010. In one embodiment, the tilting mechanism comprises a rack and pion mechanism wherein one of the rack or pinion is affixed to the housing, and the other component is affixed to the position system, wherein the rack is curved and the pion interengages the rack such that rotating the pinion causes the rack to move relative to the pinion. In one embodiment, as shown in FIG. 20, the rack 2003 is affixed to the housing 2001 and the pinion (not shown) is affixed to the positioning system 2005. In this particular embodiment, the rack is affixed to the top of the housing, although other embodiments are possible, for example, the rack may be affixed to the rear of the housing.

In one embodiment, the rack is curved, defining a focal point. The rack is positioned such that the focal point and the position point are essentially the same point. This way, as the imaging head is tilted, the vertical position of the position point remains essentially the same, thereby avoiding the need to continuously reposition the imaging head each time it is tilted to a new position. As used in this context, essentially means that tilting the imaging head does not affect the position point of the imaging point to the degree that an operator will notice. For example, in one embodiment, the focal point is less than 20 mm from the position point, in another embodiment, it is less than 10 mm, in yet another embodiment, it is less than 5 mm, and in still another embodiment, it is less than 3 mm.

In one embodiment, the imaging system is configured to seat around the opening of a lateral pipe. More specifically, rather than attempting to position the imaging system vertically within a pipe, it may be easier in certain situations to seat the imaging system in the pipe. This is especially the case if the pipe is approximately the same size as the housing of the imaging system. For example, the imaging system can be specially configured to seat in six to eight inch pipes (very common) by having a collar disposed around the front perimeter of the housing, sized to be received partially in a pipe. This allows the user to push the collar into a lateral pipe of similar size such that the collar seats in the pipe and thereby centers the imaging system therein.

In one embodiment, the imaging head is detachable from the positioning system to allow for its stationary operation. Such a configuration may be preferred, for example, in a surveillance application.

The identification system 815 provides an indication of the location to which the recorded images pertain. The identification system may comprise a location recording system 816, which is in one embodiment an automated position locator such as a global position system, which provides the programmable controller with location data regarding the specific position of the imaging head. Such systems are well known. This information then can be automatically recorded along with image data. One can analogize the location data being recorded along with the image data to a date stamp on a photograph. The use of the location data, however, can be much more versatile and involve different graphical displays and output in combination with the image (see, e.g., the discussion above regarding step (d) of the inspection method).

The identification system 815 may also include correlating images with directional information. Such a feature is particularly beneficial if the GPS coordinates for a particular image are insufficient to identify the image. For example, it is not uncommon for several lateral pipes to terminate in a common manhole. Having just the GPS coordinates of the manhole therefore is insufficient to determine which lateral pipe is imaged. Accordingly, in one embodiment, the image is also correlated with information of the direction in which the image is taken (e.g., N, NE, E, SE, S, SW, W, NW, and N).

The identification system 815 may also comprise an indexing system 817 to catalog the images according to particular targets. Such systems are well known and described for example in U.S. Pat. No. 6,175,380.

The measuring system 814 functions to provide the user with target data from, for example, a target measurement device 819 or a range finder 818. For example, it may be preferable to employ the measurement system depicted and describe in U.S. Pat. No. 6,538,732 hereby incorporated by reference.

In another embodiment, the measurement system uses a laser range finder to determine the distance between the imaging head and the target object. In one embodiment, the range finder uses a beam to determine the distance to the object. In one embodiment, the beam is a laser beam, which produces a visual spot on the object, thereby providing visual confirmation to the operator of the point to which the beam is measuring. The object reflects the beam back to a photo-detector on the range finder where the reflected beam is detected. The time delay or wave phase difference between sending the beam and detecting the reflected beam is processed by circuitry within the range finder (e.g., a detector and time delay circuitry) to determine the distance between the range finder and the object. Alternatively, the range finder may incorporate sonic pulses or other conventional distance measuring technique. The range finder generates a measurement signal that corresponds to the distance between the range finder and the object. An example of a suitable range finder 1206 is the DATA DISTO™ RS232 available through Leica AG, although other types of range finders will be readily apparent to those in the art.

While the present invention has been particularly shown and described with reference to the preferred mode as illustrated in the drawing, it will be understood by one skilled in the art that various changes in detail may be effected therein without departing from the spirit and scope of the invention as defined by the claims. For example, pipe inspection has been considered in detail in this disclosure, it should be understood that the present invention is applicable to the inspection of any area located in an inaccessible and/or uninhabitable location as described above. For example, the device may be used to quickly and conveniently inspect the containment of a nuclear reactor without erecting scaffolding. By performing inspections quickly without extensive set-ups, the overall radiation dose incurred by personnel is reduced. Additionally, in addition to nuclear reactors, the inspection system of the present invention can be used in a host of other applications including, for example, the inspection of snubbers, pipe hangers, pipe insulation, storage vessels, and the like which are commonly found in power generating stations (such as fossil fuel, nuclear, and hydro), refineries, and, practically speaking, any other significant industrial facility. Furthermore, aside from industrial applications, the system of the present invention may be used for examining vehicles or structures for evidence of terrorist activity. For example, rather than crawling under a truck or entering a confined space that might contain a bomb or biological threat, the inspection system may be used first to determine whether a closer inspection or perhaps robotic intervention (e.g., bomb defusing) is required. It should also be understood that the imaging system of the present invention may be used independently of a positioning system. That is, the light weight and low power consumption of the imaging system renders it very portable and a user may simple hold the imaging system as he or she would any portable camera. In this respect, not only may the invention be practiced without a positioning member, but also it may be practiced in certain embodiment, without an image device. That is, the high intensity and low power consumption of the modular lamp assembly in combination with the parabolic reflector lends itself to portable light applications, such as flash lights and search lights.

What is claimed is:

1. An imaging system having a forward and rearward orientation, said system comprising:

at least one housing;

an imaging device in said housing;

an elongated member connected to said housing; and a tilting mechanism operatively connecting said housing and said elongated member, said tilting mechanism having a curved rack defining a focal point within said housing about which said housing pivots as said tilting mechanism is actuated to cause said housing to tilt.

2. The imaging system of claim 1, wherein said tilting mechanism is manual.

3. The imaging system of claim 1, further comprising a motor to pivot said housing about said focal point.

4. The imaging system of claim 3, wherein said rack is operatively affixed to said elongated member and is stationary as said housing pivots.

5. The imaging system of claim 3, wherein said rack is affixed to said housing and moves as said housing pivots.

6. The imaging system of claim 5, wherein said tilting mechanism also comprises a pinion to form a rack and pinion system, such that rotating said pinion causes said housing to pivot around said focal point.

7. The imaging system of claim 6, wherein said pinion is operatively affixed to said elongated member.

8. The imaging system of claim 1, further comprising:

one or more parabolic reflectors having a base, a focus, and a reflector axis, said one or more parabolic reflectors defining a central reflector axis;

at least one a light source disposed near or essentially at said focus of each of said one or more parabolic reflectors forward of its base, and being configured to emit light toward said each of said one or more parabolic reflectors such that said each of said one or more parabolic reflectors reflects said light to emit a beam of light; and said imaging device disposed within said one or more parabolic reflectors, and comprising a zooming lens having an optical axis essentially coincident with said central reflector axis, said imaging device configured to image a field of view along said optical axis forward of said imaging device.

9. The imaging system of claim 8, wherein said one or more parabolic reflectors comprises a plurality of parabolic reflectors.

10. The imaging system of claim 9, wherein said central reflector axis is the axis of the axes of said plurality of parabolic reflectors.

11. The imaging system of claim 9, wherein said plurality of parabolic reflectors comprises four parabolic reflectors.

12. The imaging system of claim 11, wherein said four parabolic reflectors comprise identical quadrants.

13. The imaging system of claim 8, wherein said at least one light source radiates light essentially perpendicular to said reflector axis.

14. The imaging system of claim 8, wherein said at least one a light source is at least one light emitting diode (LED).

15. The imaging system of claim 8, wherein said one or more parabolic reflectors comprises a single parabolic reflector and said central reflector axis is said reflector axis.

16. The imaging system of claim 1, further comprising:

a ratchet mechanism and a targeting fixture, said targeting fixture being operatively connected to said elongated member and having a distal end and a resilient member for applying a biasing force to bias said distal end outwardly from said imaging device, said ratchet mechanism being configured such that, as said distal end is push toward said imaging device against said biasing force, said ratchet mechanism incrementally ratchets up said distal end to prevent said distal end from returning to its extended position away from said imaging device.

17. The imaging system of claim 16, wherein said ratchet mechanism is configured to release said targeting fixture once said distal end is pushed in toward said imaging device to a certain point.

18. The imaging system of claim 1, wherein said rack is affixed to the top of the housing.

* * * * *